US012627781B2

(12) United States Patent
Hagiwara et al.

(10) Patent No.: US 12,627,781 B2
(45) Date of Patent: May 12, 2026

(54) IMAGE PROCESSING APPARATUS AND IMAGE PROCESSING METHOD

(71) Applicant: Socionext Inc., Kanagawa (JP)

(72) Inventors: Soichi Hagiwara, Yokohama (JP); Yuji Umezu, Yokohama (JP); Junzo Sakurai, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 141 days.

(21) Appl. No.: 18/779,562

(22) Filed: Jul. 22, 2024

(65) Prior Publication Data

US 2024/0380871 A1 Nov. 14, 2024

Related U.S. Application Data

(63) Continuation of application No. PCT/JP2022/002723, filed on Jan. 25, 2022.

(51) Int. Cl.
*H04N 9/64* (2023.01)
*H04N 9/73* (2023.01)

(52) U.S. Cl.
CPC .................................... *H04N 9/73* (2013.01)

(58) Field of Classification Search
CPC ............. H04N 9/73; H04N 9/64; H04N 23/88
See application file for complete search history.

(56) References Cited

U.S. PATENT DOCUMENTS 11,350,048 B1 * 5/2022 Magnani ................ H04N 9/646
11,367,168 B2 * 6/2022 Koshisaka ............. G06V 20/56
2004/0234155 A1 11/2004 Hoshuyama
2013/0222531 A1 * 8/2013 Hirai .................. H04N 25/6153 348/32
2015/0304619 A1 * 10/2015 Takasumi ............... H04N 23/88 348/223.1

(Continued)

FOREIGN PATENT DOCUMENTS

JP 2004-200971 A 7/2004
JP 2011-254311 A 12/2011

(Continued)

OTHER PUBLICATIONS

International Search Report of International Application No. PCT/JP2022/002723 dated Apr. 19, 2022.

*Primary Examiner* — Mekonnen D Dagnew
(74) *Attorney, Agent, or Firm* — Rimon P.C.

(57) ABSTRACT

An image processing apparatus performs a process including acquiring first image data, calculating a white balance value used for an automatic white balance adjustment according to the first image data, performing an automatic white balance adjustment on the first image data according to the white balance value to generate image data after a first correction, calculating a first luminance in the image data after the first correction by adding a color difference component to a luminance, and detecting a first region including a pixel having the first luminance higher than a first threshold value, calculating a correction degree of color information of a pixel included in the first region in the image data after the first correction, according to the first luminance, and correcting the color information of the pixel included in the first region in the image data after the first correction, according to the correction degree.

13 Claims, 22 Drawing Sheets

(56) References Cited

U.S. PATENT DOCUMENTS

| | | | | |
|---|---|---|---|---|
| 2017/0374260 | A1* | 12/2017 | Ichikawa | H04N 23/84 |
| 2021/0014465 | A1 | 1/2021 | Morikawa et al. | |

FOREIGN PATENT DOCUMENTS

| | | | |
|---|---|---|---|
| JP | 2019-022027 | A | 2/2019 |
| JP | 2020-156016 | A | 9/2020 |
| WO | 2019/111921 | A1 | 6/2019 |

* cited by examiner

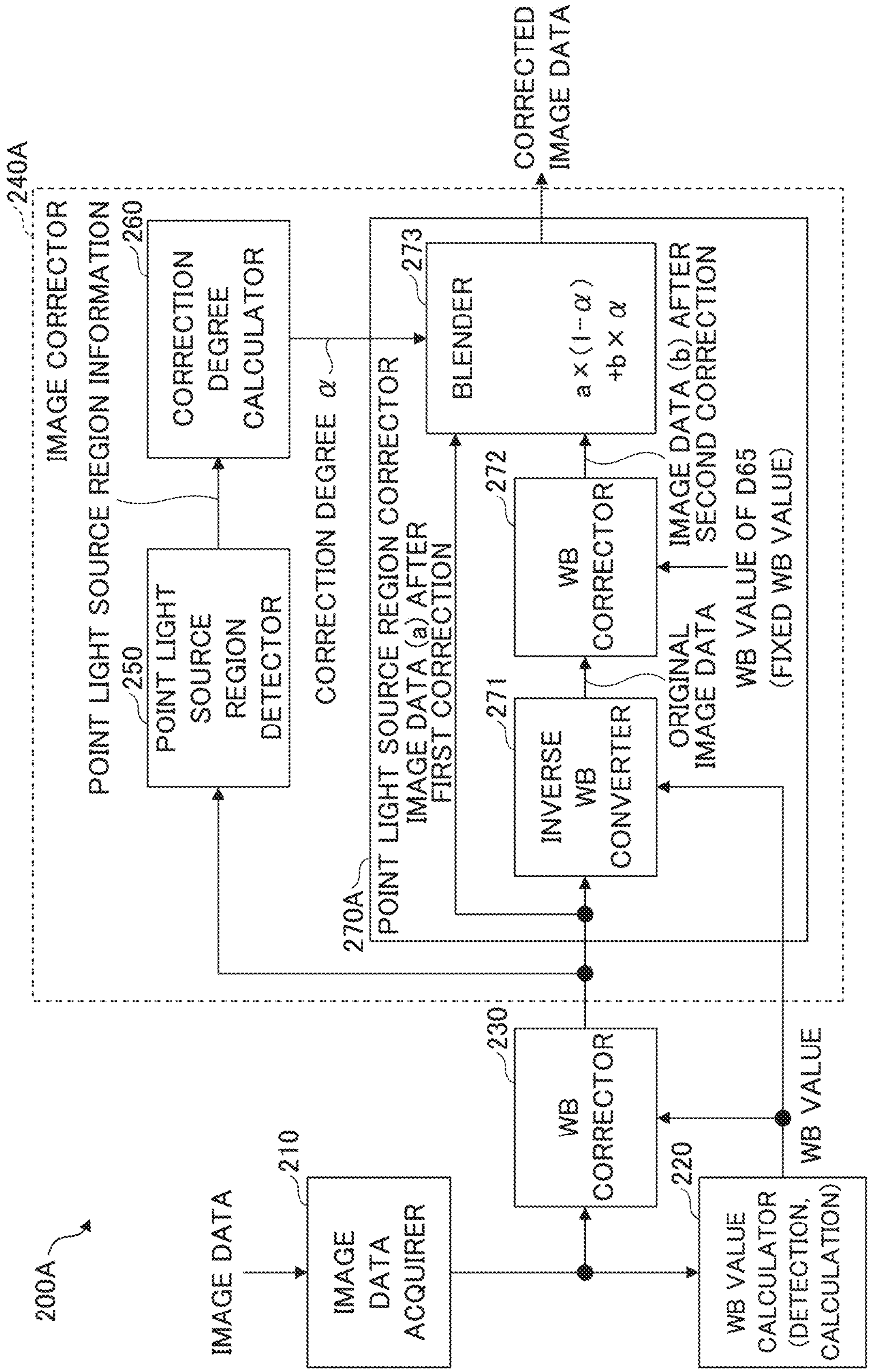

IMAGE DATA

210
IMAGE DATA ACQUIRER

240A
IMAGE CORRECTOR

POINT LIGHT SOURCE REGION INFORMATION

250
POINT LIGHT SOURCE REGION DETECTOR

260
CORRECTION DEGREE CALCULATOR

CORRECTION DEGREE $\alpha$

270A
POINT LIGHT SOURCE REGION CORRECTOR

IMAGE DATA (a) AFTER FIRST CORRECTION

271
INVERSE WB CONVERTER

272
WB CORRECTOR

273
BLENDER $a \times (1 - \alpha)$
$+b \times \alpha$

IMAGE DATA (b) AFTER SECOND CORRECTION

CORRECTED IMAGE DATA

ORIGINAL IMAGE DATA

WB VALUE OF D65 (FIXED WB VALUE)

230
WB CORRECTOR

220
WB VALUE CALCULATOR (DETECTION, CALCULATION)

WB VALUE

Illumination region of main light source

Main light source

Point light source region          Headlamp          Example of subject

Example of imaging device (a) Example of captured image of imaging device

Point light source region (b) Example of image of image data after first correction Point light source region (c) Example of image of corrected image data

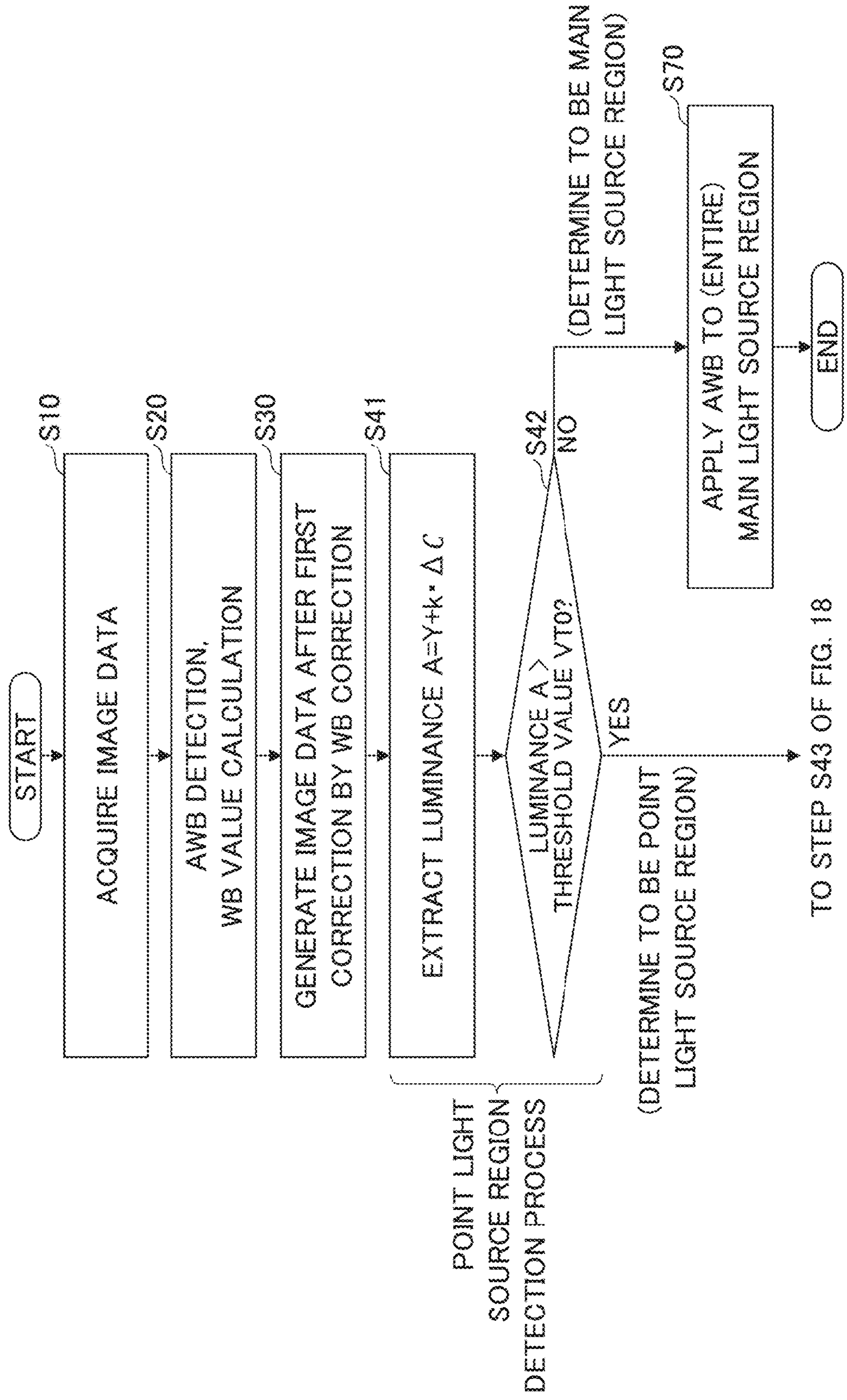

FIG.17

START

ACQUIRE IMAGE DATA — S10

AWB DETECTION, WB VALUE CALCULATION — S20

GENERATE IMAGE DATA AFTER FIRST CORRECTION BY WB CORRECTION — S30

EXTRACT LUMINANCE $A = Y + k \cdot \Delta C$ — S41

LUMINANCE A > THRESHOLD VALUE VT0? — S42

NO (DETERMINE TO BE MAIN LIGHT SOURCE REGION)

APPLY AWB TO (ENTIRE) MAIN LIGHT SOURCE REGION — S70

END

YES (DETERMINE TO BE POINT LIGHT SOURCE REGION)

TO STEP S43 OF FIG. 18

POINT LIGHT SOURCE REGION DETECTION PROCESS

IMAGE PROCESSING APPARATUS AND IMAGE PROCESSING METHOD

CROSS-REFERENCE TO RELATED APPLICATIONS

This application is a continuation application of International Application No. PCT/JP2022/002723 filed on Jan. 25, 2022 and designated the U.S., the entire contents of which are incorporated herein by reference.

FIELD

The embodiments discussed herein are related to image processing apparatuses and image processing methods.

BACKGROUND

In an image processing apparatus, there is a known technique proposed in Japanese Laid-Open Patent Publication No. 2011-254311, for example, which estimates a light source and corrects colors of an image using a color profile created for each type of light source, when performing a white balance adjustment on the image captured under a light source that greatly affects blushing. On the other hand, there is a known technique proposed in International Publication Pamphlet No. WO 2019/111921, which reduces a color saturation of image data based on a color temperature specified from a subject image in a case where a specific luminous element is included in the subject image, when performing the white balance adjustment on an image acquired under illumination.

For example, in a case where a subject region including a self-luminous subject, such as a headlamp, a traffic light, or the like, is captured under illumination of a street lamp such as a sodium-vapor lamp, a color reproducibility of the self-luminous subject may deteriorate if an automatic white balance adjustment is performed on the captured image.

SUMMARY

Accordingly, it is an object in one aspect of the embodiments to reduce a deterioration of a color reproducibility of a self-luminous subject caused by an automatic white balance adjustment even in a case where the self-luminous subject is included in a subject region illuminated by a main light source.

According to one aspect of the embodiments, an image processing apparatus includes a memory device configured to store a program; and a processor configured to execute the program and perform a process including acquiring first image data; calculating a white balance value used for an automatic white balance adjustment according to the first image data; performing an automatic white balance adjustment on the first image data according to the white balance value to generate image data after a first correction; calculating a first luminance in the image data after the first correction, obtained by adding a color difference component to a luminance, and detecting a first region including a pixel having the first luminance higher than a first threshold value; calculating a correction degree of color information of a pixel included in at least the first region in the image data after the first correction, according to the first luminance; and correcting the color information of the pixel included in at least the first region in the image data after the first correction, according to the correction degree.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a functional block diagram illustrating an example of the functional configuration of the image processing apparatus according to a second embodiment;

FIG. 17 is a flow chart illustrating an example of the operation of the image processing apparatus in FIG. 15;

DESCRIPTION OF EMBODIMENTS

Hereinafter, embodiments will be described with reference to the drawings. In the following description, image data may also be simply referred to as an image. In addition, a pixel value or pixel data may also be simply referred to as a pixel. The embodiments described below can obtain notable effects in a situation where a subject is illuminated with illumination light from a street lamp at night, inside a tunnel, or the like, but predetermined effects are obtainable even in a dusky situation at dawn, dusk, or the like, or in a bad weather situation when fog or the like is generated.

First Embodiment

Figure 1:
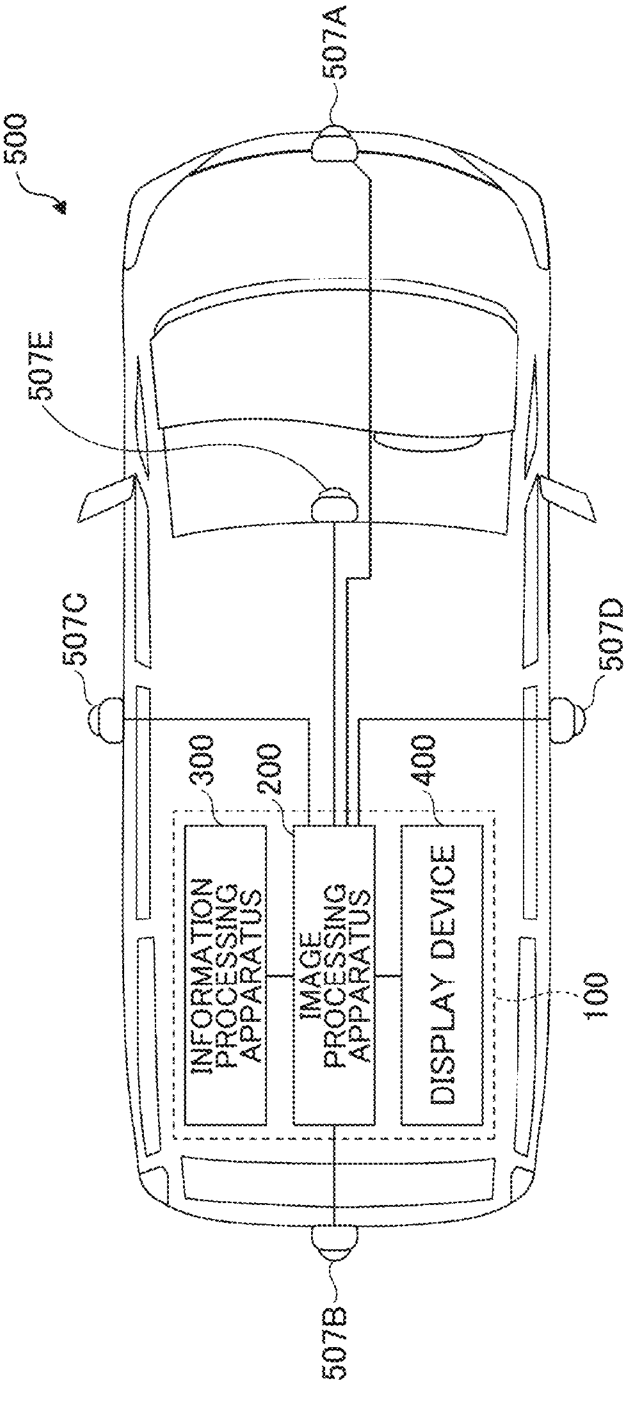
FIG. 1 is a conceptual diagram illustrating an example of an image processing system including an image processing apparatus according to a first embodiment.

FIG. 1 illustrates an example of an image processing system including an image processing apparatus according to a first embodiment. An image processing system 100 illustrated in FIG. 1 is provided in a movable body 500, such as an automobile or the like. Imaging devices 507A, 507B, 507C, 507D, and 507E, such as cameras or the like, are provided at the front, rear, and left and right sides of the movable body 500 and at the front inside a cabin of the movable body 500. Hereinafter, the imaging devices 507A, 507B, 507C, 507D, and 507E may also be referred to as imaging devices 507 when not distinguishing the imaging devices from one another.

The number of imaging devices 507 that are provided, and the positions where the imaging devices 507 are provided in the movable body 500 are not limited to those illustrated in FIG. 1. For example, one imaging device 507 may be provided only at the front of the movable body 500, or two imaging devices 507 may be provided at the front and the rear of the movable body 500, respectively. Alternatively, the imaging device 507 may be provided on a ceiling of the movable body 500. The movable body 500 on which the image processing system 100 is provided is not limited to an automobile, and may be a transport robot or a drone that operates inside a factory, for example. The image processing system 100 may be a system that processes an image acquired from an imaging device, such as a monitoring camera, a digital still camera, a digital camcorder, or the like, other than the imaging devices provided on the movable body 500.

The image processing system 100 includes an image processing apparatus 200, an information processing apparatus 300, and a display device 400. In order to facilitate the understanding, FIG. 1 illustrates the image processing system 100 in an overlapping manner on the conceptual diagram of the movable body 500 viewed from above. However, in actual practice, the image processing apparatus 200 and the information processing apparatus 300 are implemented in a control board or the like that is provided in the movable body 500, and the display device 400 is provided at a position visible from a person inside the movable body 500. The image processing apparatus 200 may be implemented in the control board or the like, as a part of the information processing apparatus 300. Each imaging device 507 is connected to the image processing apparatus 200 via a signal line, or is wirelessly connected to the image processing apparatus 200.

Figure 2:
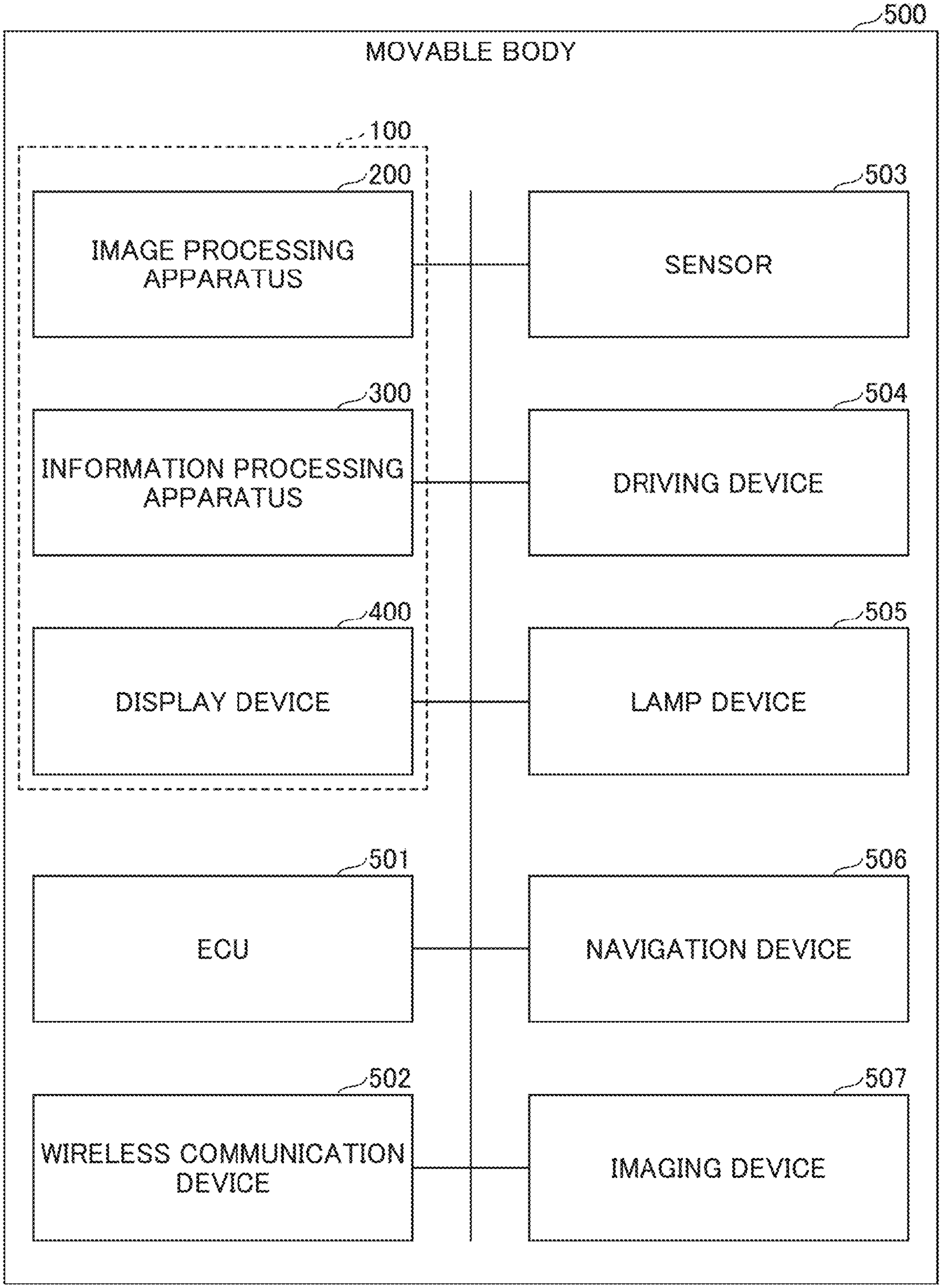
FIG. 2 is a block diagram generally illustrating a configuration of various devices provided in a movable body of FIG. 1.

FIG. 2 generally illustrates a configuration of various devices provided in the movable body 500 of FIG. 1. The movable body 500 includes the image processing apparatus 200, the information processing apparatus 300, the display device 400, at least one electronic control unit (ECU) 501, and a wireless communication device 502, which are mutually connected via an internal network. In addition, the movable body 500 includes a sensor 503, a driving device 504, a lamp device 505, a navigation device 506, and the imaging device 507. For example, the internal network is an in-vehicle network, such as a controller area network (CAN), an Ethernet (registered trademark), or the like.

The image processing apparatus 200 corrects image data (or frame data) acquired by the imaging device 507, and generates corrected image data. For example, the image processing apparatus 200 displays the generated corrected image data on the display device 400. The image processing apparatus 200 may record the generated corrected image data in an external or internal recording device.

The information processing apparatus 300 includes a computer, such as a processor or the like that performs a recognition process or the like based on the image data received via the image processing apparatus 200. For example, the information processing apparatus 300 provided in the movable body 500 detects another movable body, a traffic lights, a road sign, a white line on a road, a person, or the like by performing the recognition process on the image data, and determines a situation around the movable body 500 based on the detection result.

In addition, the information processing apparatus 300 controls the ECU 501 to control the entire movable body 500. Moreover, the information processing apparatus 300 may include an autonomous driving control device that controls the movement, stop, right turn, left turn, or the like of the movable body 500. In this case, the information processing apparatus 300 may include a function to recognize an external object outside the movable body 500, based on the image generated by the image processing apparatus 200, and may include a function to track the recognized object.

The display device 400 displays the image, the corrected image, or the like generated by the image processing apparatus 200. The display device 400 may be a side mirror monitor, a rearview mirror monitor, or a display of a navigation device provided in the movable body 500. The display device 400 may be a display provided on a dashboard or the like, a head-up display that projects an image on a projection board, a windshield, or the like, or the like. In addition, the display device 400 may display an image in a backward direction of the movable body 500 in real time when the movable body 500 moves backward (or rearward). Further, the display device 400 may display an image output from the navigation device 506.

The ECU 501 is provided in correspondence with each mechanism, such as an engine, a transmission (or gear box), or the like. Each ECU 501 controls the corresponding mechanism, based on an instruction from the information processing apparatus 300. The wireless communication device 502 communicates with an external device outside the movable body 500. The sensor 503 may detect various kinds of information. For example, the sensor 503 may include a position sensor that acquires current position information of the movable body 500. The sensor 503 may include a velocity sensor that detects a velocity of the movable body 500.

The driving device 504 includes various devices associated with moving the movable body 500. For example, the driving device 504 may include an engine, a steering device (or steering), a braking device (or brake), or the like. The lamp device 505 includes various types of lighting devices provided in the movable body 500. For example, the lamp device 505 may include a headlamp (or headlight), a direction indicator lamp (or blinker), a backup light, a brake lamp, or the like. The navigation device 506 is a device that guides a route to a destination by voice and display.

Figure 3:
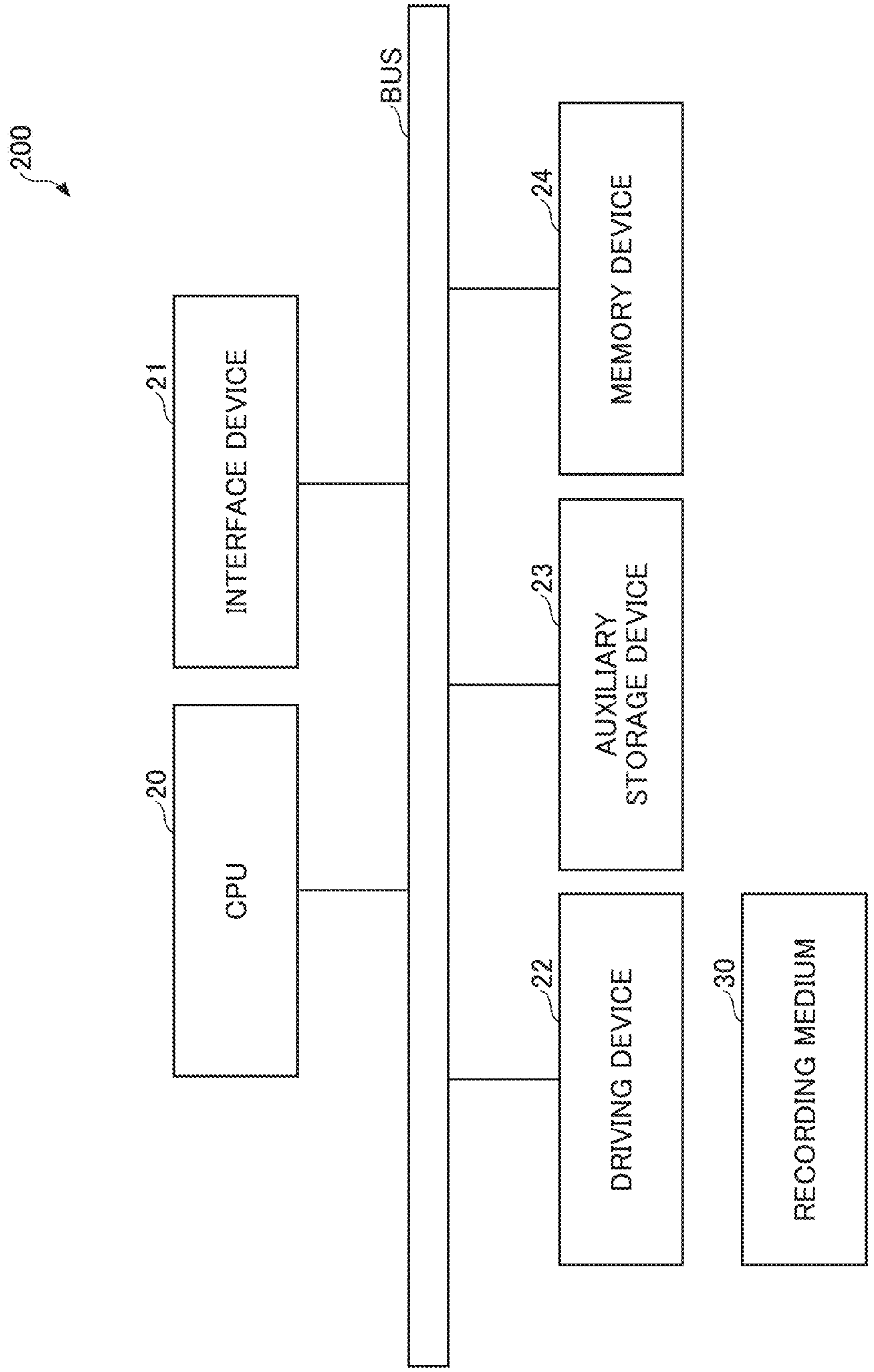
FIG. 3 is a block diagram illustrating an example of a configuration of the image processing apparatus in FIG. 2.

FIG. 3 illustrates an example of a configuration of the image processing apparatus 200 illustrated in FIG. 2. The information processing apparatus 300 illustrated in FIG. 2 may have the same configuration as the image processing apparatus 200 illustrated in FIG. 3. For example, the image processing apparatus 200 includes a central processing unit (CPU) 20, an interface device 21, a drive device 22, an auxiliary storage device 23, and a memory device 24, which are mutually connected via a bus.

The CPU 20 performs various kinds of image processing which will be described later, by executing an image processing program stored in the memory device 24. The interface device 21 is used for making a connection to a network (not illustrated). The auxiliary storage device 23 may be a hard disk drive (HDD), a solid state drive (SSD), or the like, for example, and stores the image processing program, image data, various parameters used for the image processing, or the like.

The memory device 24 may be a dynamic random access memory (DRAM) or the like, for example, and stores the image processing program or the like transferred from the auxiliary storage device 23. The drive device 22 has an interface for making a connection to the recording medium 30, and transfers the image processing program stored in the recording medium 30 to the auxiliary storage device 23 based on an instruction from the CPU 20, for example. The drive device 22 may transfer the image data or the like stored in the auxiliary storage device 23 to the recording medium 30.

Figure 4:
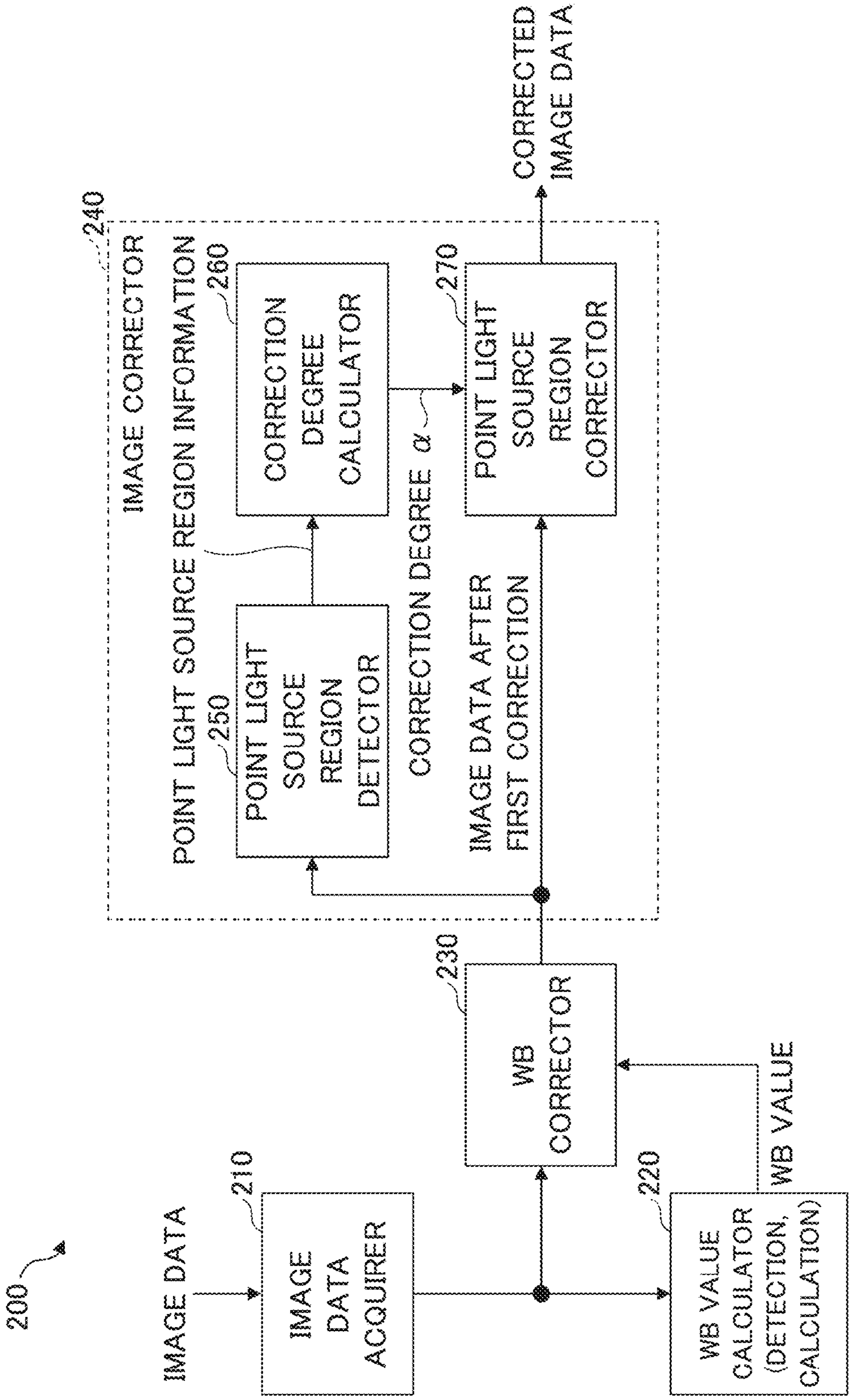
FIG. 4 is a functional block diagram illustrating an example of a functional configuration of the image processing apparatus in FIG. 2.

FIG. 4 illustrates an example of a functional configuration of the image processing apparatus 200 illustrated in FIG. 2. Each functional unit (or functional part) of the image processing apparatus 200 illustrated in FIG. 4 may be implemented by the image processing program executed by the image processing apparatus 200 or may be implemented by hardware, such as a field programmable gate array (FPGA) or the like, provided in the image processing apparatus 200. The functional units of the image processing apparatus 200 illustrated in FIG. 4 may be implemented by causing software and hardware to cooperate with each other.

The image processing apparatus 200 includes an image data acquirer (or image data acquisition unit, device, or circuit) 210, a white balance (WB) value calculator (or WB value calculation unit, device, or circuit) 220, a white balance (WB) corrector (or WB correction unit, device, or circuit) 230, and an image corrector (or image correction unit, device, or circuit) 240. The image corrector 240 includes a point light source region detector (or point light source region detection unit, device, or circuit) 250, a correction degree calculator (or correction degree calculation unit, device, or circuit) 260, and a point light source region corrector (or point light source region correction unit, device, or circuit) 270. Hereinafter, the white balance (or white balance adjustment or correction) may also be simply referred to as the WB, and an automatic white balance (or automatic white balance adjustment or correction) may also be simply referred to as the AWB.

The image data acquirer 210 performs an image data acquisition process to acquire an image (for example, frame data) representing an image captured by the imaging device 507E or the imaging device 507A, for example, among the plurality of imaging devices 507 illustrated in FIG. 1. The image data acquired by the image data acquirer 210 is an example of first image data. The image data acquirer 210 may acquire an image captured by an imaging device 507 other than the imaging devices 507E and 507A, or may acquire images captured by all of the imaging devices 507.

The WB value calculator 220 performs a detection to determine a main light source that illuminates the subject with the illumination, based on the image data acquired by the image data acquirer 210, and performs a white balance value calculation process to calculate a WB value corresponding to the determined light source. That is, the WB value calculator 220 calculates a white balance value used for the automatic white balance adjustment.

The WB corrector 230 performs a first white balance correction process to generate image data after first correction, by performing the automatic white balance adjustment on each pixel of the image data according to the WB value calculated by the WB value calculator 220. For example, each pixel subjected to the automatic white balance adjustment includes one red pixel, one blue pixel, and two green pixels arranged in a Bayer array (or Bayer pattern). The WB corrector 230 is an example of a first white balance corrector.

The point light source region detector 250 performs a point light source region detection process to detect a point light source region (pixel region) included in the image data after the first correction. The point light source region detector 250 is an example of a region detector, and the point light source region is an example of a first region.

In this example, the point light source includes a self-luminous subject, such as a headlamp of a vehicle, a lamp of a traffic light, or the like. The point light source region may include not only a region of the self-luminous subject, but also a region where a halation is generated by the self-luminous subject and a region of a subject that reflects light emitted from the self-luminous subject. The point light source region detector 250 outputs point light source region information indicating the detected point light source region to the correction degree calculator 260. An example of a point light source region detection process of the point light source region detector 250 will be described later with reference to FIG. 6.

The point light source region detector 250 may output, for each pixel of the image data after the first correction, a luminance A which includes a color difference component as will be described later, and a threshold value of the luminance A used for detecting the point light source region, as point light source region information, to the correction degree calculator 260. In addition, the point light source region detector 250 may output the luminance A of each pixel of the image data after the first correction to the correction degree calculator 260, as the point light source region information. In this case, because the process of detecting the region of pixels having the luminance A higher than or equal to a predetermined threshold value as the point light source region is performed by the correction degree calculator 260, the function of detecting the point light source region is included in the correction degree calculator 260. Further, the point light source region detector 250 functions as a luminance calculator that calculates the luminance A.

The correction degree calculator 260 performs a correction degree calculation process to calculate a correction degree $\alpha$ used for correcting color information of pixels in the point light source region, according to the point light source region information. The correction degree calculator 260 may calculate the correction degree α for each pixel of the image data after the first correction including the point light source region, in addition to the correction degree α used for correcting the color information of the pixels in the point light source region. An example of calculation of the correction degree α performed by the correction degree calculator 260 will be described later with reference to FIG. 7.

The point light source region corrector 270 performs a color information correction process to correct the color information of each pixel in the point light source region included in the image data after the first correction, using the correction degree α calculated by the correction degree calculator 260. The point light source region corrector 270 is an example of a color information corrector. A method of further correcting the image data after the first correction already subjected to the automatic white balance adjustment, using the correction degree α, will be described later with reference to FIG. 7. The point light source region corrector 270 outputs the corrected image data obtained by correcting the color information of the pixels of the point light source region included in the image data after the first correction to at least one of the display device 400 and the information processing apparatus 300.

Figure 5:
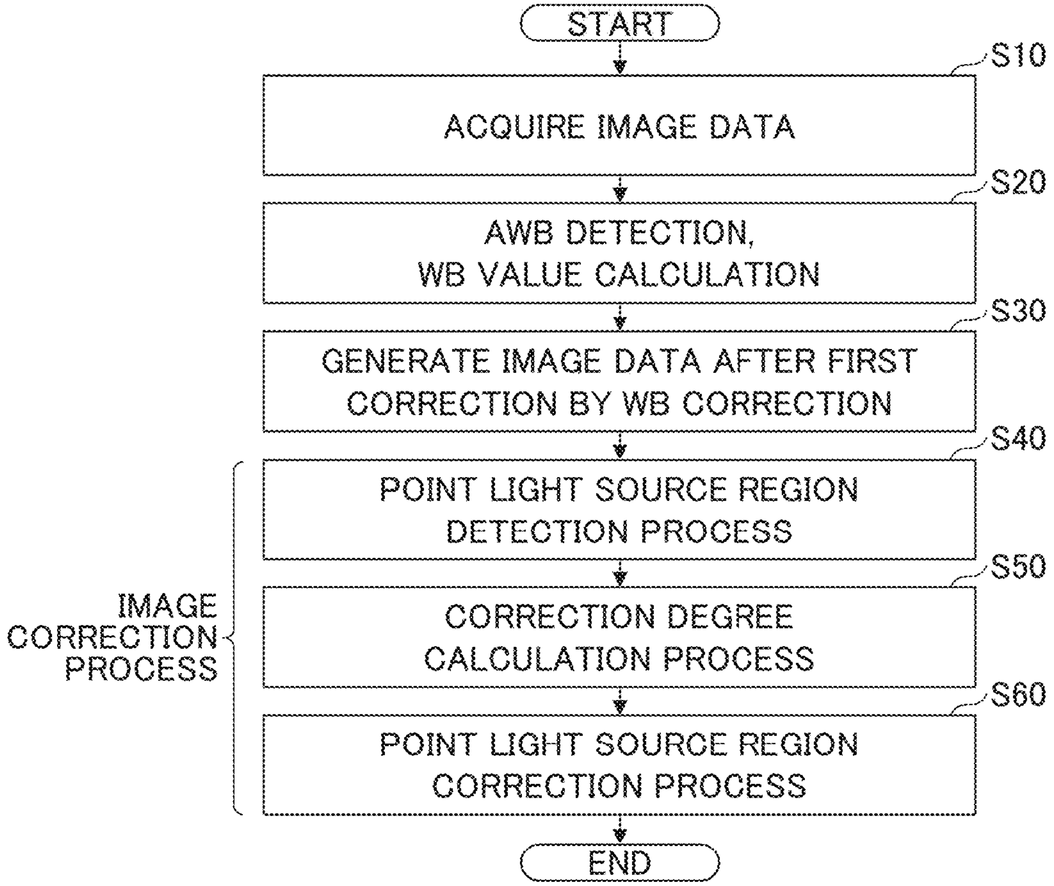
FIG. 5 is a flow chart illustrating an example of an operation of the image processing apparatus in FIG. 2.

FIG. 5 is a flow chart illustrating an example of an operation of the image processing apparatus 200 illustrated in FIG. 2. That is, FIG. 5 illustrates an example of an image processing method performed by the image processing apparatus 200, and illustrates an example of an image processing program executed by the image processing apparatus 200.

First, in step S10, the image data acquirer 210 of the image processing apparatus 200 acquires the image data captured by each of the imaging devices 507. Next, in step S20, the image processing apparatus 200 performs a detection process to perform the automatic white balance adjustment based on the acquired image data, and calculates a WB value, by the WB value calculator 220, for example. Next, in step S30, the image processing apparatus 200 performs the white balance adjustment on the image data according to the WB value, by the WB corrector 230, for example, and generates the image data after the first correction.

Next, in steps S40, S50, and S60, the image processing apparatus 200 performs a correction process on the image data after the first correction, by the image corrector 240, for example. First, in step S40, the image processing apparatus 200 detects a point light source region included in the image data after the first correction, by the point light source region detector 250, for example. The point light source region may be indicated by the luminance A and the threshold value.

Next, in step S50, the image processing apparatus 200 calculates the correction degree α used for correcting the color information of at least the pixels in the point light source region, according to the luminance A of the point light source region, by the correction degree calculator 260, for example. Next, in step S60, the image processing apparatus 200 corrects the color information of at least the pixels in the point light source region of the image data after the first correction, by the point light source region corrector 270, for example, using the correction degree α calculated by the correction degree calculator 260. Further, the point light source region corrector 270 generates the corrected image data, and ends the process illustrated in FIG. 5.

Figure 6:
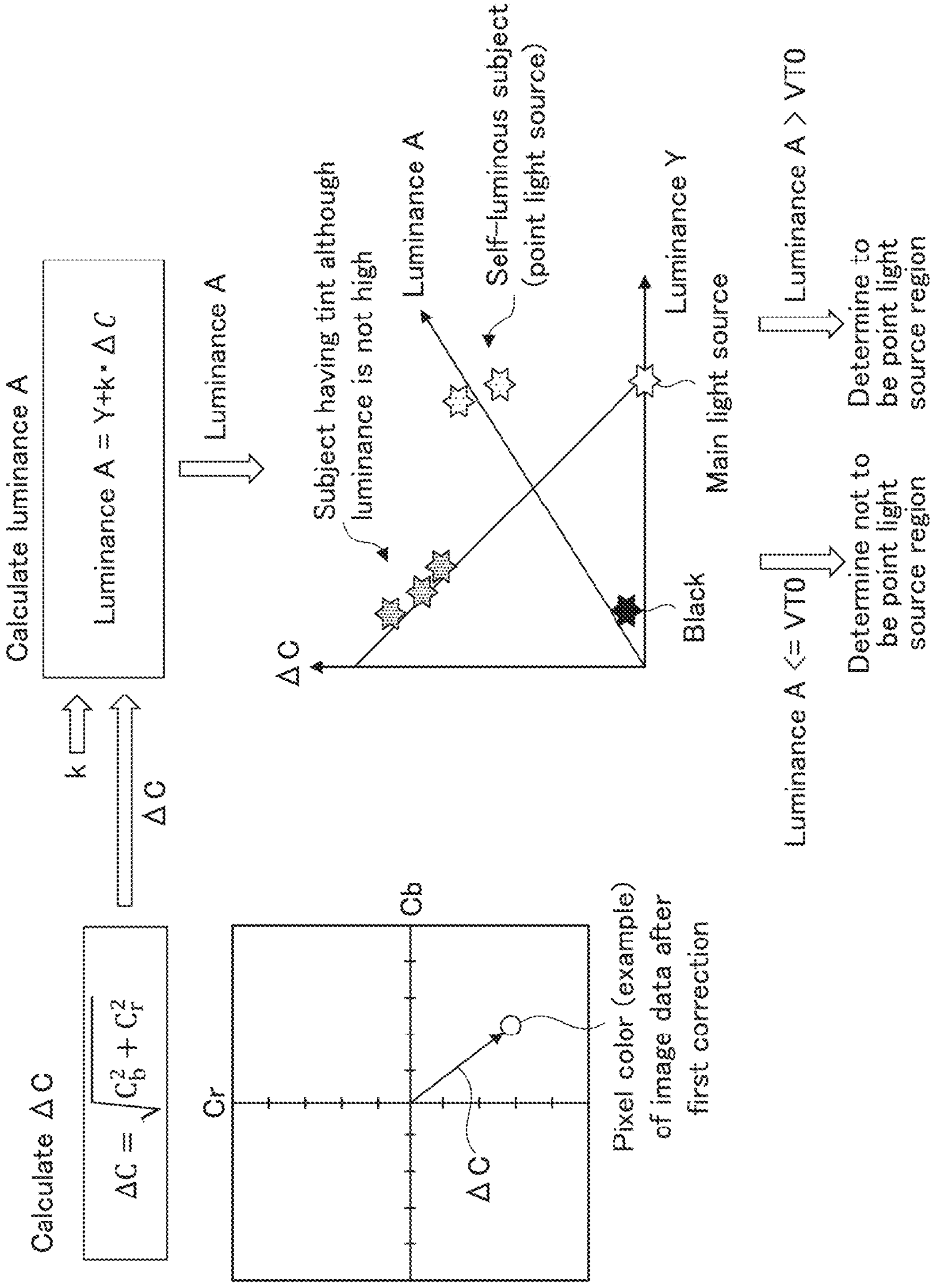
FIG. 6 is an explanatory diagram illustrating an example of a process performed by a point light source region detector in FIG. 4.

FIG. 6 illustrates an example of a process performed by the point light source region detector 250 illustrated in FIG. 4. First, the point light source region detector 250 calculates a distance ΔC from an origin of the color of each pixel of the image data after the first correction, already subjected to the white balance adjustment, in a color difference space CbCr. The distance ΔC indicates a color depth of the pixel, for example. Next, the point light source region detector 250 calculates the luminance A by adding a luminance Y of the pixel and the calculated distance ΔC using the following formula (1).

$$A = Y + k \cdot \Delta C \tag{1}$$

The luminance A is a sum of the luminance Y, which is luminance information of the pixel represented in a YCbCr color space, and a value obtained by multiplying a coefficient k to the distance ΔC, which is an index of the color depth (vividness) of the pixel. The luminance A is an example of a first luminance. The coefficient k is used to adjust a weighting of the distance ΔC, and is a value greater than "0". The coefficient k is set in advance at the time of designing the image processing apparatus 200 or at the time of evaluating the performance of the image processing apparatus 200.

For example, as illustrated in a graph of the luminance Y and the distance ΔC in FIG. 6, the luminance A of the self-luminous subject having a high luminance Y and a relatively large distance ΔC becomes high. The luminance Y of a main light source, such as a street lamp or the like, that illuminates the subject to be captured by the imaging device 507 with the illumination light, is high. However, because the color of the main light source becomes an achromatic color by the automatic white balance adjustment, the luminance A of the main light source becomes sufficiently lower than the luminance A of the self-luminous subject.

Because the luminance Y and the distance ΔC of a black pixel is small, the luminance A of the black pixel is sufficiently lower than the luminance A of the self-luminous subject. The luminance A of a pixel having a large distance ΔC (dark color) but a small luminance Y is also sufficiently smaller than the luminance A of the self-luminous subject.

The point light source region detector 250 determines that a pixel having a luminance A lower than or equal to a predetermined threshold value VT0 is not a point light source region, and determines that a pixel having a luminance A higher than the threshold value VT0 is a point light source region. For example, the threshold value VT0 is set to a value higher than the luminance A of the main light source, such as the street lamp or the like, after the automatic white balance adjustment.

Figure 7:
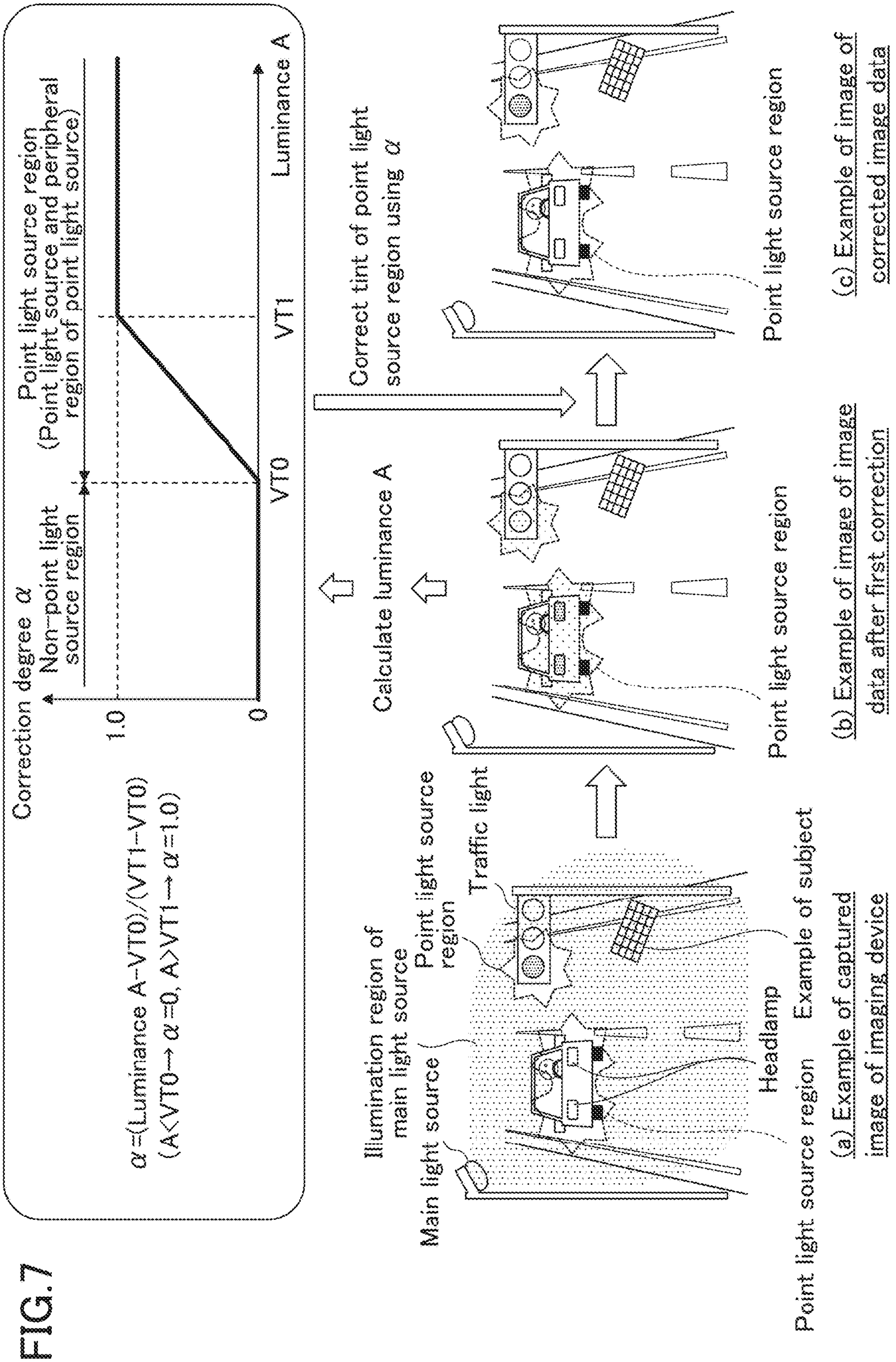
FIG. 7 is an explanatory diagram illustrating examples of processes performed by a correction degree calculator and a point light source region corrector in FIG. 4.

A graph of FIG. 7 illustrates examples of processes performed by the correction degree calculator 260 and the point light source region corrector 270 of FIG. 4. The correction degree calculator 260 sets the correction degree α of a pixel having a luminance A lower than the threshold value VT0 to "0", and sets the correction degree α of a pixel having a luminance A higher than the threshold value VT1 to "1". The point light source region corrector 270 sets the correction degree α of the pixel having a luminance A higher than or equal to a threshold value VT0 and lower than or equal to a threshold value VT1 to a value which becomes higher as the luminance A becomes higher, according to the following formula (2). The threshold value VT0 is an example of a first threshold value, and the threshold value VT1 is an example of a second threshold value.

$$\alpha = (A - VT0)/(VT1 - VT0) \tag{2}$$

In this example, the correction degree α indicates a correction factor of the image data after the first correction, corrected of the color information by the point light source region corrector 270. Accordingly, the correction degree calculator 260 calculates the correction factor of the color information of the image data after the first correction according to the luminance A.

A pixel having the correction degree α of "0" is not subjected to the correction with respect to the image data after the first correction, as the point light source region. A pixel having the correction degree α of "1" is subjected to 100% of the correction with respect to the image data after the first correction, as the point light source region. Similarly, a pixel having the correction degree α of "0.3" is subjected to 30% of the correction with respect to the image data after the first correction, and a pixel having the correction degree α of "0.7" is subjected to 70% of the correction with respect to the image data after the first correction, as the point light source region.

A section (a) of FIG. 7 illustrates an example of a captured image that is captured by the imaging device 507E. A section (b) of FIG. 7 illustrates an example of an image of the image data after the first correction, already subjected to the automatic white balance adjustment by the WB corrector 230. A section (c) of FIG. 7 illustrates an example of an image of the corrected image data corrected by the point light source region corrector 270.

In the captured image illustrated in section (a) of FIG. 7, the illumination of the main light source, such as the sodium-vapor lamp or the like, illuminates the subject region, and the image of the road and the subject on the road is tinted by the illumination of the main light source. Because an image of the point light source region including the self-luminous subject such as the headlamp of the vehicle, the lamp of the traffic light, or the like and a periphery of the self-luminous subject is not affected by the illumination of the main light source, the image has a color similar to a tint under a daylight light source (has color reproducibility).

In the image data after the first correction already subjected to the automatic white balance adjustment illustrated in section (b) of FIG. 7, the image in the region excluding the point light source region has a color similar to the tint under the daylight light source (has color reproducibility). On the other hand, the image of the point light source region has a color different from the tint under the daylight light source due to the automatic white balance adjustment (the color reproducibility deteriorates). The point light source region detector 250 calculates the luminance A of each pixel from the image data after the first correction, corresponding to the image illustrated in section (b) of FIG. 7, and detects the point light source region.

In the corrected image data subjected to the correction of the color information of the point light source region in section (c) of FIG. 7, the tint of the image of the point light source region ($0<=\alpha$) corrected by the automatic white balance adjustment is corrected according to the correction degree α, and is converted into the color similar to the tint under the daylight light source. A result of the automatic white balance adjustment is reflected as it is to the image in the region ($\alpha<0$) excluding the point light source region, and the image has the color similar to the tint under the daylight light source.

Accordingly, the point light source region corrector 270 can correct the color information of each pixel after the automatic white balance adjustment of the point light source region including the self-luminous subject excluding the main light source. As a result, it is possible to reduce a deterioration of the color reproducibility of the point light source region due to the automatic white balance adjustment. In addition, because the main light source, such as the street lamp or the like, is not included in the subject to be corrected of the color information by the point light source region corrector 270, it is possible to prevent the tint of the main light source corrected by the automatic white balance adjustment from becoming unnatural.

As described above, in this embodiment, the tint of the self-luminous subject whose color reproducibility deteriorates due to the automatic white balance adjustment can be corrected to the tint under the daylight light source. Hence, both the image of the road and the subject on the road, tinted with the illumination of the main light source, and the image of the point light source region including the self-luminous subject and the periphery thereof, can be corrected to the tint similar to the tint under the daylight light source. As a result, even in a case where the self-luminous subject is included in the image subjected to the automatic white balance adjustment under the illumination of the main light source, it is possible to generate an image reproduced in correct colors.

In this case, even in the region where the halation is generated due to the self-luminous subject and in the region of the subject that reflects the light emitted from the self-luminous subject, it is possible to correct the color of the pixel whose color reproducibility deteriorates due to the automatic white balance adjustment to the tint similar to the tint under the daylight light source.

The point light source region detector 250 calculates the luminance A including the color difference component, so that the luminance A of the main light source can be made lower than the threshold value VT0. For example, the point light source region detector 250 sets the sum of the luminance Y of the pixel represented by the YCbCr color space and the distance ΔC (color difference component) from the origin in the color difference space CbCr as the luminance A. As a result, the tint of the pixel of the main light source corrected by the white balance adjustment can be prevented from becoming unnatural due to the correction by the point light source region corrector 270.

The correction degree calculator 260 calculates the correction degree α used for correcting the color information of the pixel in the point light source region y, so that it is possible to prevent a rapid change in the color of the pixels in the image at a boundary between the point light source region and a non-point light source region. As a result, it is possible to prevent the image at the boundary from becoming unnatural.

Second Embodiment

FIG. 8 illustrates an example of the functional configuration of the image processing apparatus according to a second embodiment. In FIG. 8, those elements that are the same as the elements illustrated in FIG. 4 are designated by the same reference numerals, and a detailed description thereof will be omitted. An image processing apparatus 200A illustrated in FIG. 8 is similar to the image processing apparatus 200 illustrated in FIG. 1 through FIG. 3, and is provided in the image processing system 100 together with the information processing apparatus 300 and the display device 400.

Each functional unit (or functional part) of the image processing apparatus 200A illustrated in FIG. 8 may be implemented software, such as an image processing program or the like executed by the image processing apparatus 200A, or may be implemented by hardware, or may be implemented by causing software and hardware to cooperate with each other.

The image processing apparatus 200A includes an image corrector 240A in place of the image corrector 240 illustrated in FIG. 4. The image corrector 240A includes a point light source region corrector 270A in place of the point light source region corrector 270 illustrated in FIG. 4. Otherwise, the configuration of the image processing apparatus 200A is similar to that of the image processing apparatus 200 illustrated in FIG. 4.

The point light source region corrector 270A includes an inverse WB converter (or inverse WB conversion unit, device, or circuit) 271, a WB corrector (or WB correction unit, device, or circuit) 272, and a blender (or blending processor, device, or circuit) 273. The point light source region corrector 270A is an example of a color information corrector. The inverse WB converter 271 converts the image data after the first correction, generated by the WB corrector 230, into an original image data before the white balance adjustment, using the WB value calculated by the WB value calculator 220.

The WB corrector 272 performs the white balance adjustment on each pixel of the original image data using the WB value of a standard light source D65 (daylight illuminant), for example, and generates image data after a second correction. The WB corrector 272 is an example of a second white balance corrector. For example, the WB value of the standard light source D65 is a preset fixed WB value. By performing the white balance adjustment using the standard light source D65, the tint of the self-luminous subject, such as the headlamp, and the lamp of the traffic light, or the like, included in the original image data, can be made to have a natural tint under the daylight.

The blender 273 blends the pixel value of the image data (a) after the first correction and the pixel value of the image data (b) after the second correction (b) for each pixel, according to the correction degree α calculated by the correction degree calculator 260, using the following formula (3) to generate the corrected image data.

$$a \times (1 - \alpha) + b \times \alpha \qquad (3)$$

As a result, pixels having the correction degree α of "0" (the pixels having the luminance A lower than the threshold value VT0 in FIG. 7) become the pixels of the image data (a) after the first correction. Pixels having the correction degree α of "1" (the pixels having the luminance A higher than the threshold value VT1 in FIG. 7) become the pixels of the image data (b) after the second correction.

Further, for the pixels having the correction degree α of "0" or more and "1" or less (pixels having the correction degree α of the threshold value VT0 or higher and the threshold value VT1 or lower) the pixel values of the image data (a) after the first correction and the pixel values of the image data (b) after the second correction are blended according to the correction degree α. For example, a pixel having the correction degree α of "0.3" is blended with 70% of the pixel value of the image data (a) after the first correction and 30% of the pixel value of the image data (b) after the second correction. A pixel having a correction degree α of "0.7" is blended with 30% of the pixel value of the image data (a) after the first correction (a) and 70% of the pixel value of the image data (b) after the second correction.

The blender 273 may output the image data (a) of the first correction as the corrected image data without performing the blending process on the pixel having the correction degree of α=0 (luminance A<threshold value VT0). Similarly, the blender 273 may output the image data (b) after the second correction as the corrected image data without performing the blending process on the pixel having the correction degree of α=1 (luminance A>threshold value VT1). In this case, the blender 273 only needs to perform the blending process on the pixels having the correction degree α larger than "0" and smaller than "1", and thus, a calculation load can be reduced.

Figure 9:
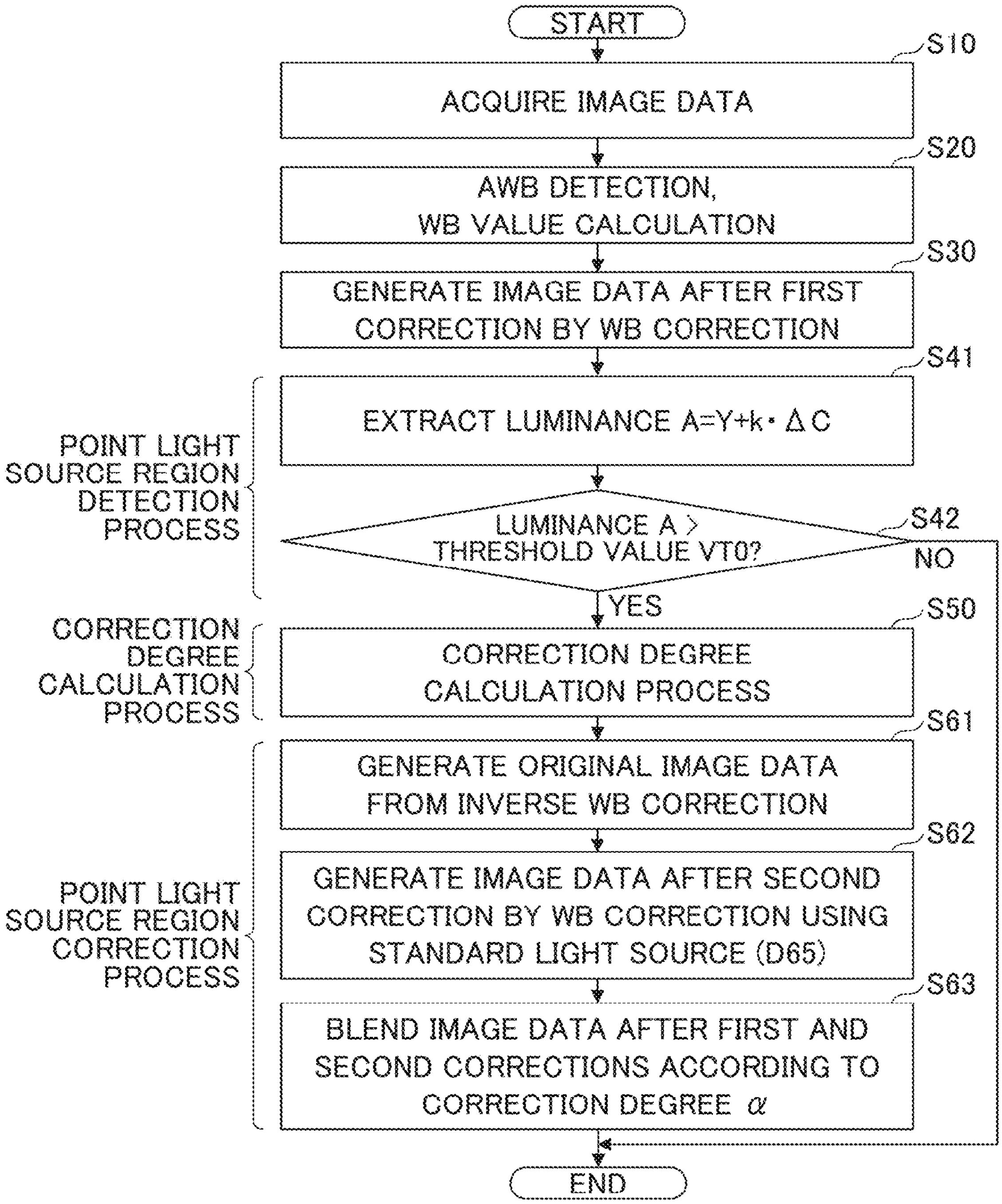
FIG. 9 is a flow chart illustrating an example of the operation of the image processing apparatus in FIG. 8.

FIG. 9 is a flow chart illustrating an example of an operation of the image processing apparatus 200A of FIG. 8. That is, FIG. 9 illustrates an example of the image processing method performed by the image processing apparatus 200A, and illustrates an example of an image processing program executed by the image processing apparatus 200A. In FIG. 9, those steps that are the same as the steps illustrated in FIG. 5 are designated by the same reference numerals, and a detailed description thereof will be omitted.

The processes of steps S10, S20, S30, and S50 are the same as the processes of steps S10, S20, S30, and S50 illustrated in FIG. 5, respectively. In FIG. 9, steps S40 and S42 are performed in place of step S41 illustrated in FIG. 5, and steps S61, S62, and S63 are performed in place of step S60 illustrated in FIG. 5. Processes of steps S61 and S62 may be performed in parallel with processes of steps S41, S42, and S50.

After step S30, in step S41, the image processing apparatus 200A calculates the luminance A of each pixel using the formula (1) described above, by the point light source region detector 250, for example. Next, in step S42, the image processing apparatus 200A determines whether or not the luminance A is higher than the threshold value VT0 for each pixel. The image processing apparatus 200A performs the process of step S50 for the pixel having the luminance A higher than the threshold value VT0, and ends the process illustrated in FIG. 9 for the pixel having the luminance A of the threshold value VT0 or lower.

In step S50, the image processing apparatus 200A calculates the correction degree α, according to the luminance A of the pixel selected in step S42, by the correction degree calculator 260, for example. Next, in step S61, the image processing apparatus 200A converts the image data after the first correction into the original image data before the white balance adjustment, by the inverse WB converter 271, for example.

Next, in step S62, the image processing apparatus 200A performs the white balance adjustment on each pixel of the original image data using the WB value of the standard light source D65, by the WB corrector 272, for example, and generates the image data after the second correction. Next, in step S63, the image processing apparatus 200A blends the pixel value of the image data after the first correction and the pixel value of the image data after the second correction for each pixel, according to the correction degree α, by the blender 273, for example, to generate the corrected image data. Then, the image processing apparatus 200A ends the process illustrated in FIG. 9.

As described above, this embodiment can obtain the same effects as those obtainable by the embodiment described above. For example, even in a case where the self-luminous subject is included in the image subjected to the automatic white balance adjustment under illumination of the main light source, it is possible to generate an image reproduced in correct colors.

Further, in this embodiment, the image processing apparatus 200A blends the image data after the first correction already subjected to the automatic white balance adjustment and the image data after the second correction already subjected to the white balance adjustment using the standard light source D65, according to the correction degree α. Thus, the tint of the self-luminous subject, such as the headlamp, the lamp of the traffic light, or the like included in the original image data can be made to have a natural tint. Moreover, because the blender 273 does not perform the blending process on the pixels having the correction degree of α=0 and α=1, it is possible to reduce the calculation load of the blender 273.

Third Embodiment

Figure 10:
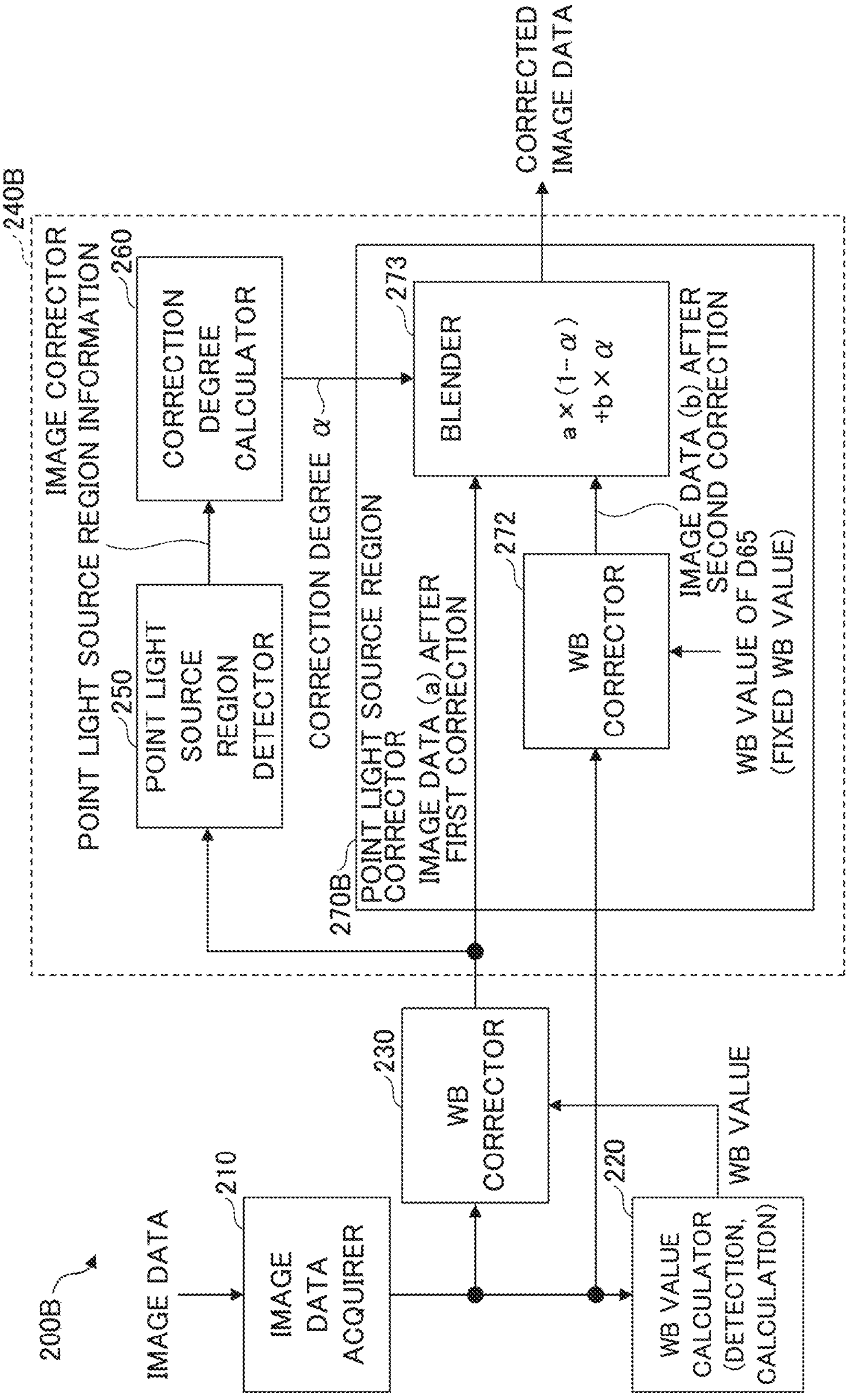
FIG. 10 is a functional block diagram illustrating an example of the functional configuration of the image processing apparatus according to a third embodiment.

FIG. 10 illustrates an example of the functional configuration of the image processing apparatus according to a third embodiment. In FIG. 10, those elements that are the same as the elements illustrated in FIG. 4 and FIG. 8 are designated by the same reference numerals, and a detailed description thereof will be omitted. An image processing apparatus 200B illustrated in FIG. 10 is similar to the image processing apparatus 200 illustrated in FIG. 1 through FIG. 3, and is provided in the image processing system 100 together with the information processing apparatus 300 and the display device 400.

Each functional unit (or functional part) of the image processing apparatus 200B illustrated in FIG. 10 may be implemented by software, such as an image processing program or the like executed by the image processing apparatus 200B, or may be implemented by hardware, or may be implemented by causing software and hardware to cooperate with each other.

The image processing apparatus 200B includes a point light source region corrector 270A in place of the point light source region corrector 270B illustrated in FIG. 8. The configuration and functions of the point light source region corrector 270B are similar to those of the point light source region corrector 270A illustrated in FIG. 8, except that the inverse WB converter 271 is omitted from the point light source region corrector 270A illustrated in FIG. 8. The point light source region corrector 270B is an example of a color information corrector. Otherwise, the configuration of the image processing apparatus 200B is similar to that of the image processing apparatus 200 illustrated in FIG. 8.

In this embodiment, the WB corrector 272 performs the white balance adjustment on each pixel of the image data acquired by the image data acquirer 210 from the imaging device 507, using the WB value of the standard light source D65, and generates the image data after the second correction. Other functions and operations of the image processing apparatus 200B are the same as those of the image processing apparatus 200A illustrated in FIG. 8.

As described above, this embodiment can obtain the same effects as those obtainable by the embodiments described above. Further, in this embodiment, the inverse WB converter 271 illustrated in FIG. 8 can be omitted, by performing the white balance adjustment using the standard light source D65, on the image data acquired by the image data acquirer 210. As a result, a processing load of the image processing apparatus 200B can be reduced even more than the image processing apparatus 200A, and the processing performance of the image processing apparatus 200B can be improved by performing other processes enabled by the reduced processing load. In addition, in a case where the point light source region corrector 270B is implemented by hardware, it is possible to reduce a circuit scale by an amount of circuitry corresponding to the inverse WB converter 271 which can be omitted.

In an environment such as at night or the like, the luminance of the self-luminous subject is high compared to the luminance of other subjects, and thus, the color may become too dark due to the white balance adjustment using the WB value of the standard light source D65, and the image of the self-luminous subject after the correction may become unnatural. In such a case, the tint may be reduced by slightly shifting characteristics of the WB value of the standard light source D65.

Fourth Embodiment

Figure 11:
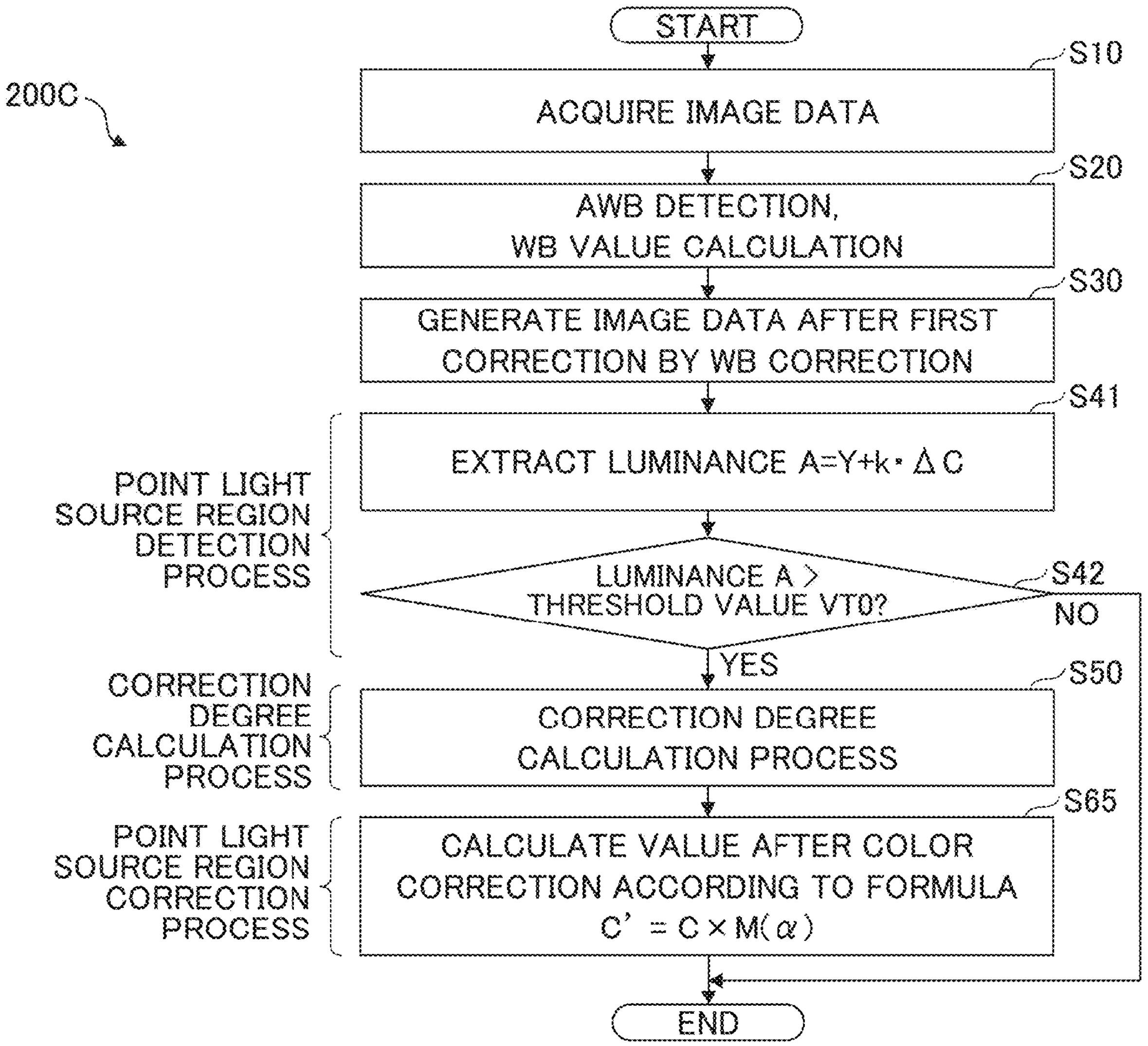
FIG. 11 is a flow chart illustrating an example of the operation of the image processing apparatus according to a fourth embodiment.

FIG. 11 is a flow chart illustrating an example of an operation of the image processing apparatus according to a fourth embodiment. An image processing apparatus 200C (not illustrated) that performs the processes of FIG. 11 has a configuration similar to that of the image processing apparatus 200 of FIG. 4. The image processing apparatus 200C is similar to the image processing apparatus 200 illustrated in FIG. 1 through FIG. 3, and is provided in the image processing system 100 together with the information processing apparatus 300 and the display device 400. FIG. 11 illustrates an example of an image processing method performed by the image processing apparatus 200C, and illustrates an example of the image processing program executed by the image processing apparatus 200C. In FIG. 11, those steps that are the same as the steps illustrated in FIG. 5 and FIG. 9 are designated by the same reference numerals, and a detailed description thereof will be omitted.

The processes of steps S10, S20, S30, and S50 are the same as the processes of steps S10, S20, S30, and S50 illustrated in FIG. 5, respectively. The processes of steps S41 and S42 are the same as the processes of steps S41 and S42 illustrated in FIG. 9, respectively. In FIG. 11, step S60 is performed in place of step S65 illustrated in FIG. 5.

After step S50, in step S65, the image processing apparatus 200C calculates a pixel value C' after the color correction using the following formula (4), by a point light source region corrector similar to the point light source region corrector 270 illustrated in FIG. 4, for example. Hereinafter, the point light source region corrector (not illustrated) included in the image processing apparatus 200C is referred to as a point light source region corrector 270C for the sake of convenience. The point light source region corrector 270C is an example of a color information corrector.

$$C' = C \times M(\alpha) \quad (4)$$

In the formula (4), a symbol C represents the pixel value of the image data after the first correction, and a symbol M(α) represents a function for converting the color of the pixel using the correction degree α as a variable. The correction degree α is the same as the correction degree α described in conjunction with FIG. 7. The function M(α) will be described later with reference to FIG. 12. A symbol C' represents the pixel value of the corrected image data. The point light source region corrector 270C corrects the color information of the pixels in the point light source region included in the image data after the first correction, and outputs the corrected image data to at least one of the display device 400 and the information processing apparatus 300.

Figure 12:
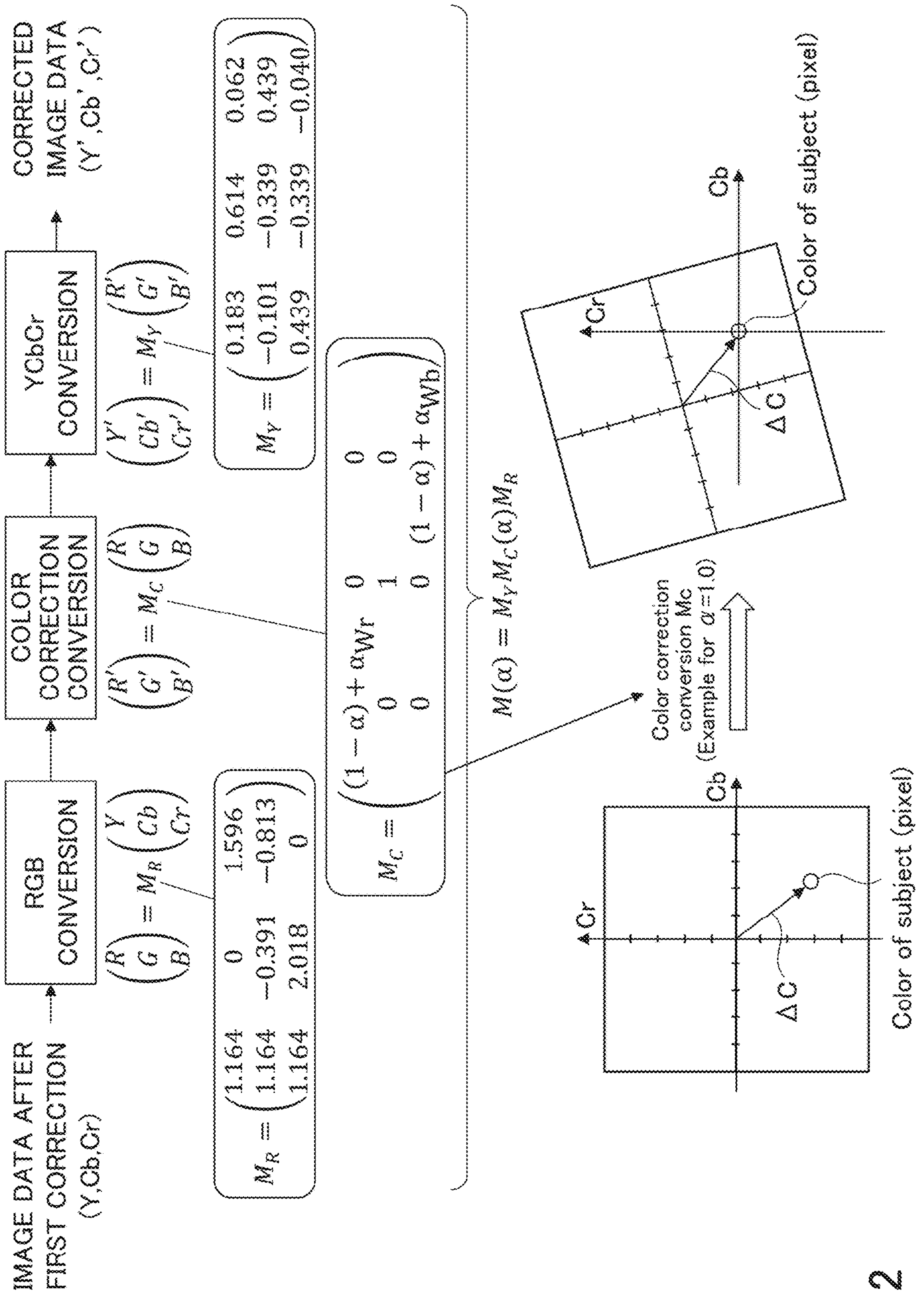
FIG. 12 is an explanatory diagram illustrating an example of a process of step S65 in FIG. 11.

FIG. 12 illustrates an example of the process of step S65 illustrated in FIG. 11. The point light source region corrector 270C of the image processing apparatus 200C converts the image data after the first correction represented in the YCbCr color space into image data in a red, green, and blue (RGB) color space using a conversion matrix $M_R$, for example.

Next, the point light source region corrector 270C converts the image data in the RGB color space converted using the conversion matrix $M_R$ into the image data in the RGB color space using a conversion matrix $M_C$ including the correction degree α as a variable. In the conversion matrix $M_C$, variables Wr and Wb are obtained by performing detection and calculation of the automatic white balance adjustment in the range of the pixels in the point light source region. For example, the variables Wr and Wb are obtained from the following formulas (5) and (6), respectively, based on a ratio of red components (R-components), green components (G-components), and blue components (B-components) of neighboring pixels of the point light source region.

$$Wr = (\text{average of } G\text{–components of neighboring pixels of pixel having } \alpha \text{ of "1"})/(\text{average of } R\text{–components of neighboring pixels of pixel having } \alpha \text{ of "1"}) \quad (5)$$

$$Wb = (\text{average of } G\text{–components of neighboring pixels of pixel having } \alpha \text{ of "1"})/(\text{average of } B\text{–components of neighboring pixels of pixel having } \alpha \text{ of "1"}) \quad (6)$$

In addition, the point light source region corrector 270C converts the image data in the RGB color space converted using the conversion matrix $M_C$ into image data M(α) in the YCbCr color space using a conversion matrix $M_Y$. In summary, the function M(α) for converting the pixel value of the image data after the first correction into the pixel value of the corrected image data can be represented by the following formula (7).

$$M(\alpha) = M_Y M_C(\alpha) M_R \quad (7)$$

For example, in the case where the correction degree α is "1.0", in the color difference space CbCr of the image data after the first correction, the color (indicated by the distance ΔC) of each pixel of the image data after the first correction is converted into an achromatic color which is the origin of the color difference space CbCr, by the function M(α). Further, the color of the pixel approaches the achromatic color as the correction degree α of the pixel becomes closer to "1.0".

Accordingly, even in the case where the self-luminous subject, such as the headlamp or the like, is included in the subject region illuminated by the street lamp, such as the sodium-vapor lamp or the like, and the self-luminous subject (point light source region) is subjected to the automatic white balance adjustment, the color of the self-luminous subject can be converted into the achromatic color. As a result, it is possible to reduce a deterioration of the color reproducibility of the point light source region due to the automatic white balance adjustment.

In the example illustrated in FIG. 12, the point light source region corrector 270C sets the pixel having the correction degree α of "1.0" (that is, 100%) to the achromatic color. However, the point light source region corrector 270C may set the pixel having the correction degree α of "1.0" to a color near the achromatic color, for example. Alternatively, the point light source region corrector 270C may set the pixel having the correction degree α of "0.9" or more to the achromatic color.

Figure 13:
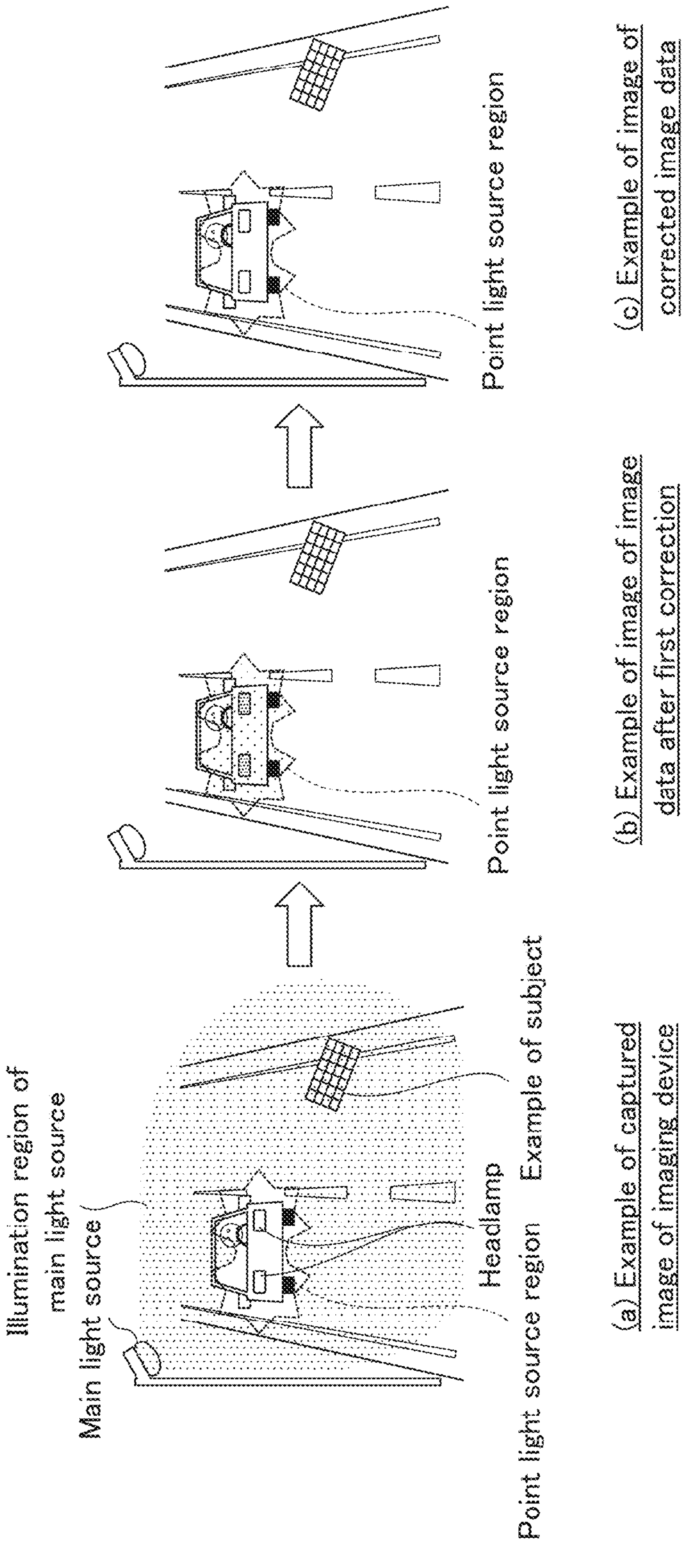
FIG. 13 is an explanatory diagram illustrating an example of an image correction by the process of the flow chart illustrated in FIG. 11.

FIG. 13 illustrates an example of an image correction by the process of the flow chart illustrated in FIG. 11. A detailed description of the elements and processes that are the same as those illustrated in FIG. 7 will be omitted. A section (a) of FIG. 13 illustrates an example of the captured image captured by the imaging device 507E. A section (b) of FIG. 13 illustrates an example of the image based on the image data after the first correction already subjected to the automatic white balance adjustment by the WB corrector (not illustrated) included in the image processing apparatus 200C. The WB corrector of the image processing apparatus 200C has the same functions as the WB corrector 230 illustrated in FIG. 4.

A section (c) of FIG. 13 illustrates an example of the image based on the corrected image data corrected by the point light source region corrector 270C of the image processing apparatus 200C.

Figure 14:
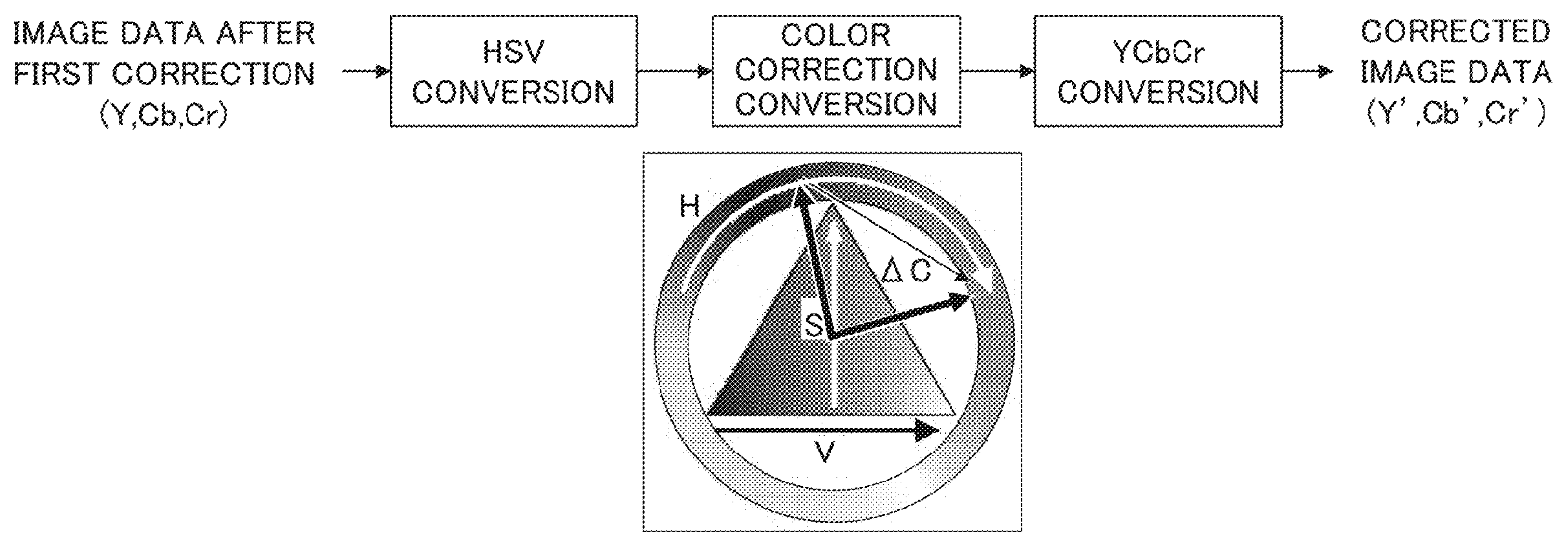
FIG. 14 is an explanatory diagram illustrating another example of the process of step S65 in FIG. 11.

FIG. 14 illustrates another example of the process of step S65 illustrated in FIG. 11. For example, the color correction conversion may be performed in a color space in which the colors can be more easily corrected than in the RGB color space, such as a hue, saturation, and value (HSV) color space, instead of performing the color correction conversion in the RBG color space.

As described above, this embodiment can obtain the same effects as those obtainable by the embodiments described above. For example, similar to FIG. 7, the color information of each pixel in the point light source region including the self-luminous subject, such as the headlamp or the like, excluding the main light source, can be corrected. As a result, it is possible to reduce a deterioration of the color reproducibility of the point light source region, including headlamp and the periphery of the headlamp, due to the automatic white balance adjustment.

Fifth Embodiment

Figure 15:
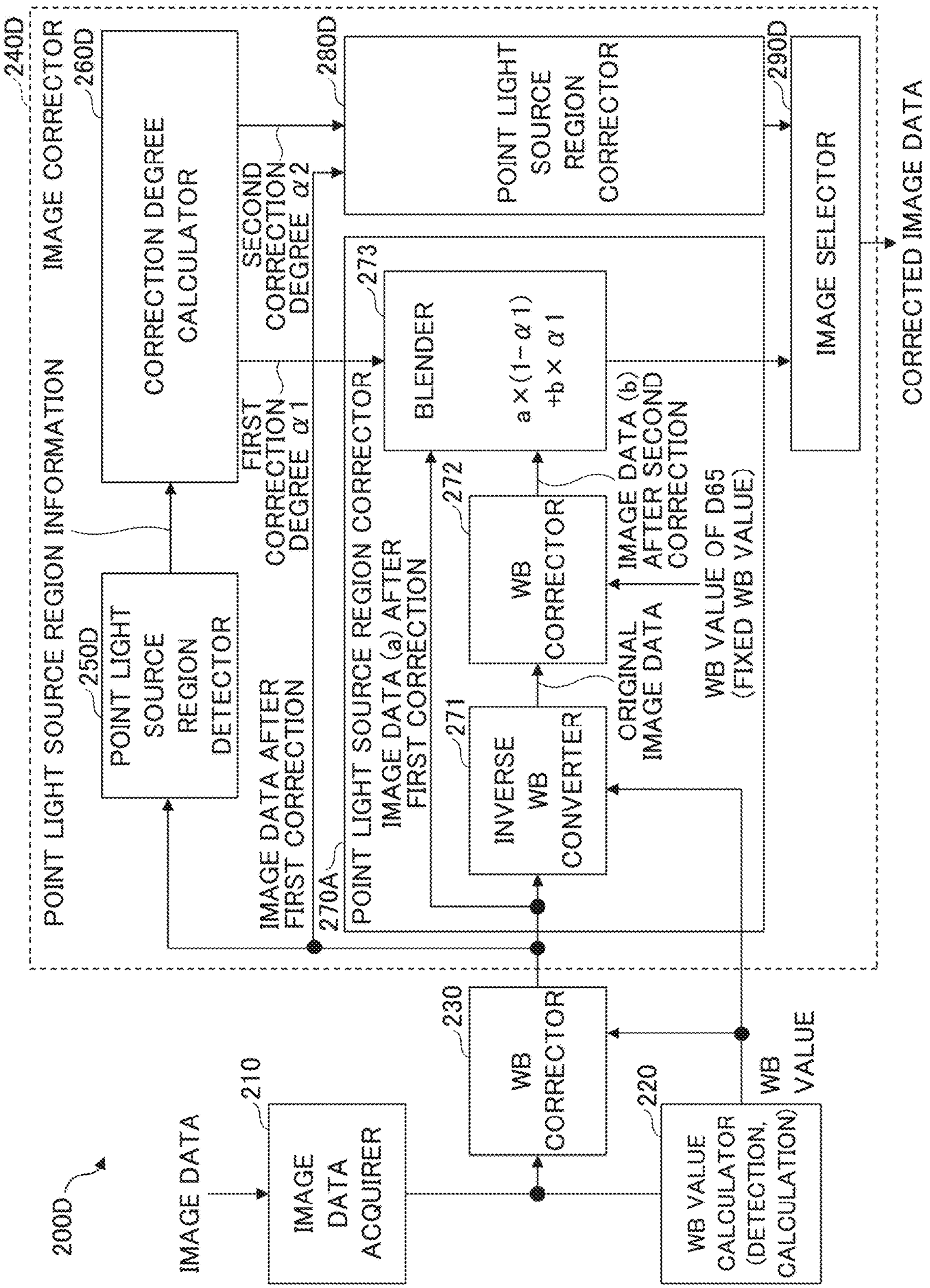
FIG. 15 is a functional block diagram illustrating an example of the functional configuration of the image processing apparatus according to a fifth embodiment.

FIG. 15 illustrates an example of the functional configuration of the image processing apparatus according to a fifth embodiment. In FIG. 15, those elements that are the same as the elements illustrated in FIG. 8 are designated by the same reference numerals, and a detailed description thereof will be omitted. An image processing apparatus 200D illustrated in FIG. 15 is similar to the image processing apparatus 200 illustrated in FIG. 1 through FIG. 3, and is provided in the image processing system 100 together with the information processing apparatus 300 and the display device 400.

Each functional unit (or functional part) of the image processing apparatus 200D illustrated in FIG. 15 may be implemented by software, such as an image processing program or the like executed by the image processing apparatus 200D, or may be implemented by hardware, or may be implemented by causing software and hardware to cooperate with each other.

The image processing apparatus 200D includes an image corrector 240A in place of the image corrector 240D illustrated in FIG. 8. The image corrector 240D includes a point light source region detector 250D and a correction degree calculator 260D in place of the point light source region detector 250 and the correction degree calculator 260 illustrated in FIG. 8, and newly includes a point light source region corrector 280D and an image selector (or image selection unit, device, or circuit) 290D. Otherwise, the configuration of the image processing apparatus 200D is similar to that of the image processing apparatus 200A illustrated in FIG. 8. The image processing apparatus 200D may include the point light source region corrector 250B illustrated in FIG. 10 in place of the point light source region corrector 270A.

The point light source region detector 250D may include a function to detect a point light source region with a preset high luminance, such as the lamp of the traffic light or the like, and a function to detect a point light source region with a preset ultra-high luminance, such as the headlamp of an automobile or the like, in the image data after the first correction. For example, the point light source region detector 250D calculates the luminance A (first luminance) by adding the color difference component to the luminance, and detects a first region including the pixels having the luminance A (first luminance) higher than a first threshold value, for each of the plurality of types of light sources. The point light source region detector 250D is an example of a region detector. An example of the point light source region detection process performed by the point light source region detector 250D will be described later with reference to FIG. 16.

The correction degree calculator 260D calculates a first correction degree $\alpha$1 used for correcting the color information of the pixels in the preset high luminance point light source region (for example, the lamp of the traffic light or the like). In addition, the correction degree calculator 260D calculates a second correction degree $\alpha$2 used for correcting the color information of the pixels other than the pixels in the preset high luminance point light source region. The pixel having the present high luminance, such as the lamp of the traffic light or the like, is an example of a specific pixel including specific color information. The pixel other than the specific pixel is an example of a normal pixel.

The point light source region corrector 270A blends the pixel value of the image data (a) after the first correction and the pixel value of the image data (b) after the second correction, for each pixel using the first correction degree $\alpha$1 in place of the correction degree $\alpha$ of FIG. 8, to generate a temporary image data after the first correction. The point light source region corrector 280D corrects the pixel value of the image data after the first correction according to the second correction degree $\alpha$2 using the method illustrated in FIG. 12, to generate a temporary image data after the second correction. The point light source region corrector 270A is an example of a first color information corrector, and the point light source region corrector 280D is an example of a second color information corrector.

The image selector 290D selects the temporary image data after the first correction generated by the point light source region corrector 270A or the temporary image data after the second correction generated by the point light source region corrector 280D, for each pixel, and outputs the selected image data as the corrected image. For example, the image selector 290D selects the temporary image data after the first correction for the pixel to be corrected using the first correction degree $\alpha$1, and selects the temporary image data after the second correction for the pixel to be corrected using the second correction degree $\alpha$2.

Figure 16:
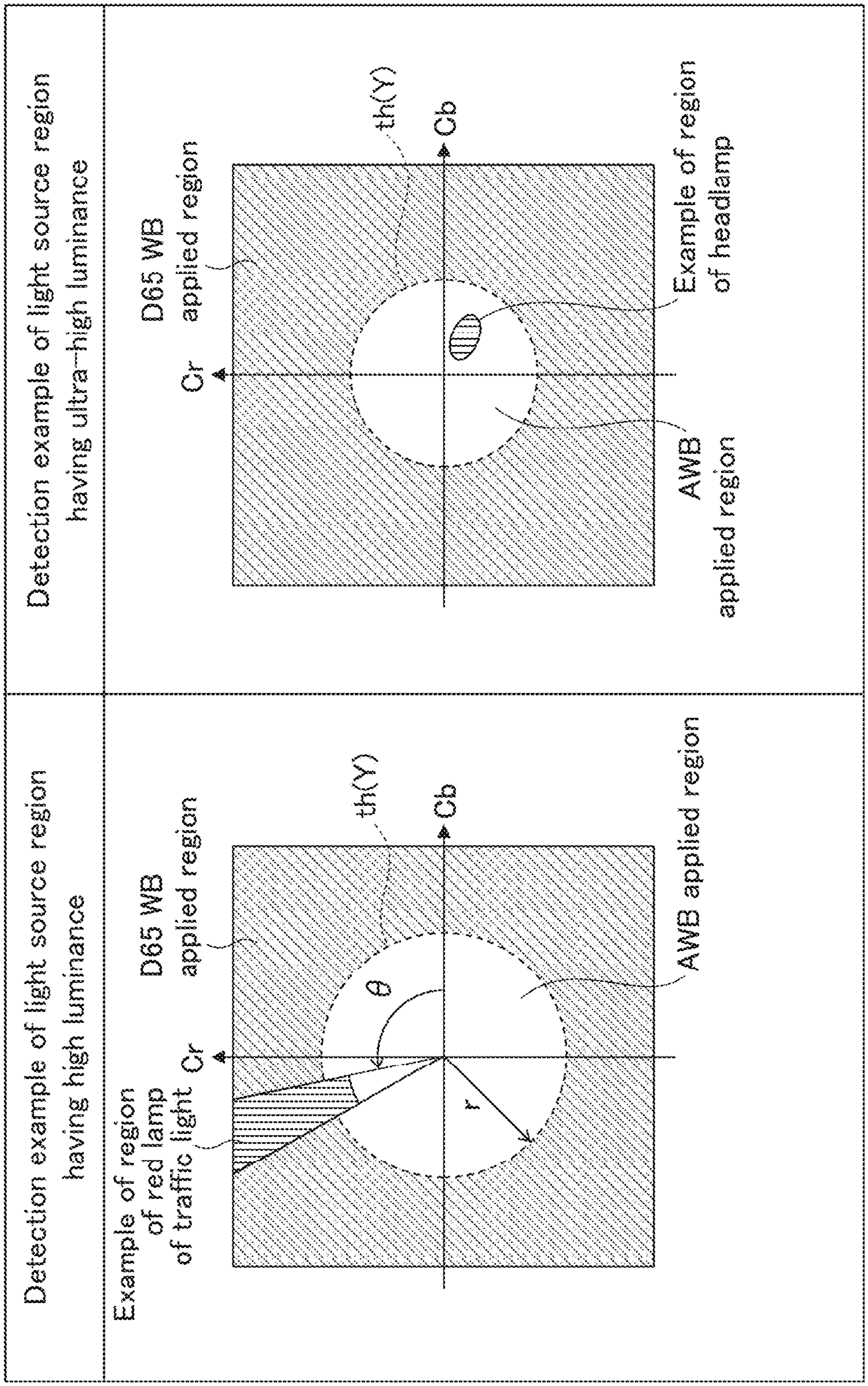
FIG. 16 is an explanatory diagram illustrating an example of a point light source detection process by the point light source region detector in FIG. 15.

FIG. 16 illustrates an example of the point light source region detection process performed by the point light source region detector 250D illustrated in FIG. 15. For example, the image processing apparatus 200D of FIG. 15 sets the light source (self-luminous subject) to be further corrected to at least one of a blue lamp, a red lamp, and a yellow lamp of the traffic light and the headlamp of the vehicle. The light source to be further corrected is further corrected of the color information of the pixel already subjected to the automatic white balance adjustment process. Further, the image processing apparatus 200D modifies the white balance adjustment of each of the light source that is assumed to be white and the light source that is assumed to be colored.

The point light source region detector 250D limits a range of an angle $\theta$ of deviation (or deviation angle $\theta$), a distances r (color intensity) from the center, and a range of the luminance in polar coordinates (r, $\theta$) of the color difference space CbCr, and regards the limited ranges as the light source. In this example, Cb=r sin $\theta$ and Cb=r cos $\theta$ stand.

For example, the point light source region detector 250D determines that a region where the distance r is greater than a threshold value th(Y) is a high saturation region, and determines that the pixel included in the high saturation region is the specific pixel and is suitable for the white balance adjustment using the standard light source D65. The white balance adjustment using the standard light source D65 will hereinafter also be referred to as "D65WB" or "D65WB process". On the other hand, the point light source region detector 250D determines that the region where the distance r is less than or equal to the threshold value th(Y) is a low saturation region, and determines that the pixel included in the low saturation region is the normal pixel and is suitable for the automatic white balance (AWB). The threshold value th(Y) is a first threshold value that varies according to the luminance, and decreases as the luminance increases. The threshold th(Y) is an example of the first threshold value.

In the example of the detection of the high saturation light source region illustrated in FIG. 16, the point light source region detector 250D detects the pixel included in a region of a color which falls within the range of the predetermined deviation angle $\theta$ and has the distance r which is greater than or equal to a predetermined value, as the red lamp of the traffic light, for example.

For example, the correction process for the color information of the pixel including the red lamp of the traffic light and the pixel other than the red lamp is as follows.

```
"if (θ>θ RedMin & & θ<θRedMax) {
   if (r> c*th(Y)){D65WB-applied or WB-applied so
  as to become specific color of traffic light}
   else {AWB-applied}
  }
  else{
   if (r>th(Y)){D65WB-applied}
   else {AWB-applied}
  }"
```

In this example, a range from θRedMin to θRedMax indicates a range of the red of the red lamp. A variable c has a value less than 1.0. The correction process is applicable to the blue lamp or yellow lamp by varying the range of the deviation angle $\theta$ and the distance r. Further, the correction process for the red lamp, the blue lamp, and the yellow lamp may be performed successively.

Figure 18:
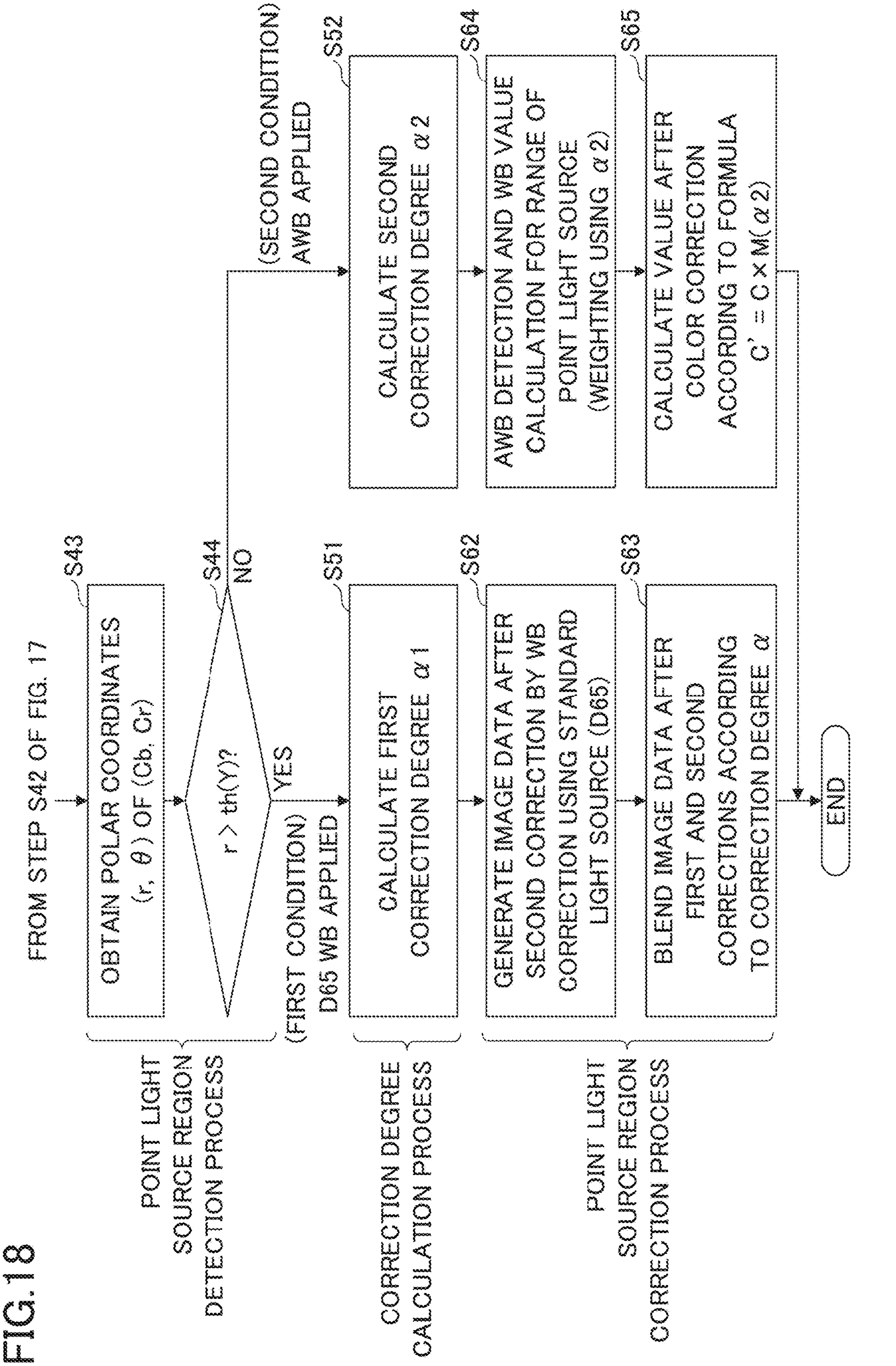
FIG. 18 is a flow chart illustrating a continuation of the operation of FIG. 17.

FIG. 17 and FIG. 18 illustrate an example of an operation of the image processing apparatus 200D of FIG. 15. That is, FIG. 17 and FIG. 18 illustrate an example of the image processing method by the image processing apparatus 200D, and illustrate an example of the image processing program executed by the image processing apparatus 200. In FIG. 17 and FIG. 18, those steps that are the same as the steps illustrated in FIG. 5 are designated by the same reference numerals, and a detailed description thereof will be omitted.

The processes of steps S10, S20, S30, S41, S42, S62, and S63 are the same as the processes of steps S10, S20, S30, S41, S42, S62, and S63 illustrated in FIG. 9, respectively. The process of step S65 is the same as the process of step S65 illustrated in FIG. 11.

In step S42, the image processing apparatus 200D determines that the region is a point light source region in a case where the luminance A is higher than the threshold value VT0, and performs step S43 illustrated in FIG. 18. In a case where the luminance A is lower than or equal to the threshold value VT0, the image processing apparatus 200D determines that the region is a main light source region illuminated by the illumination of the street lamp, and performs step S70. In step S70, the image processing apparatus 200D performs the automatic white balance adjustment with respect to the main light region which is the entire image data acquired by the image data acquirer 210, and ends the process illustrated in FIG. 17 and FIG. 18.

In step S43 illustrated in FIG. 18, the image processing apparatus 200D obtains the polar coordinates (r, θ) in the color difference space CbCr of each pixel in the image data after the first correction by the point light source region detector 250D, for example. Next, in step S44, the image processing apparatus 200D determines whether or not the distance r is greater than the threshold value th(Y), for each pixel, by the point light source region detector 250D, for example. Because the pixel having the distance r greater than the threshold value th(Y) is determined as the specific pixel and is subjected to the white balance adjustment using the standard light source D65 (D65WB), the process of step S51 is performed (first condition). On the other hand, the pixel having the distance r less than or equal to the threshold value th(Y) is determined as the normal pixel and is subjected to the automatic white balance (AWB), the process of step S52 is performed (second condition).

In step S51, the image processing apparatus 200D calculates the first correction degree α1 for each pixel to be applied with the D65WB process by the correction degree calculator 260D, for example, and advances the process to step S62. In step S52, the image processing apparatus 200D calculates the second correction degree α2 for each pixel to be applied with the AWB process by the correction degree calculator 260D, for example, and advances the process to step S64.

In steps S62 and S63, the image processing apparatus 200D performs the same processes as steps S62 and S63 illustrated in FIG. 9 by the point light source region corrector 270A, for example, and ends the process illustrated in FIG. 17 and FIG. 18.

In step S64, the image processing apparatus 200D performs the detection process to perform the automatic white balance adjustment by the point light source region corrector 280D, for example, and calculates a WB value (weighting by the second correction degree α2).

Next, in step S65, the image processing apparatus 200D performs the same process as step S65 illustrated in FIG. 11, and calculates the pixel value C' after the color correction using the formula (4) described above, by the point light source region corrector 280D, for example, and ends the process illustrated in FIG. 17 and FIG. 18.

As described above, this embodiment can obtain the same effects as those obtainable by the embodiments described above. Further, in this embodiment, the method of detecting the plurality of types of point light sources is set according to the characteristics of the color information of each point light source, and thus, each of the plurality of types of point light sources can be detected with a high accuracy. Hence, the color of the pixel in the point light source region corresponding to each point light source can be reproduced on the image with a high accuracy.

The image processing apparatus 200D can correct the color information of the pixel in the detected point light source region by detecting the point light source region by a method similar to that of FIG. 16, even in the case of the self-luminous subject other than the lamp of the traffic light and the headlamp. For this reason, it is possible to reduce a deterioration in the color reproducibility of the point light source region corresponding to each of the plurality of types of point light sources due to the automatic white balance adjustment.

Sixth Embodiment

Figure 19:
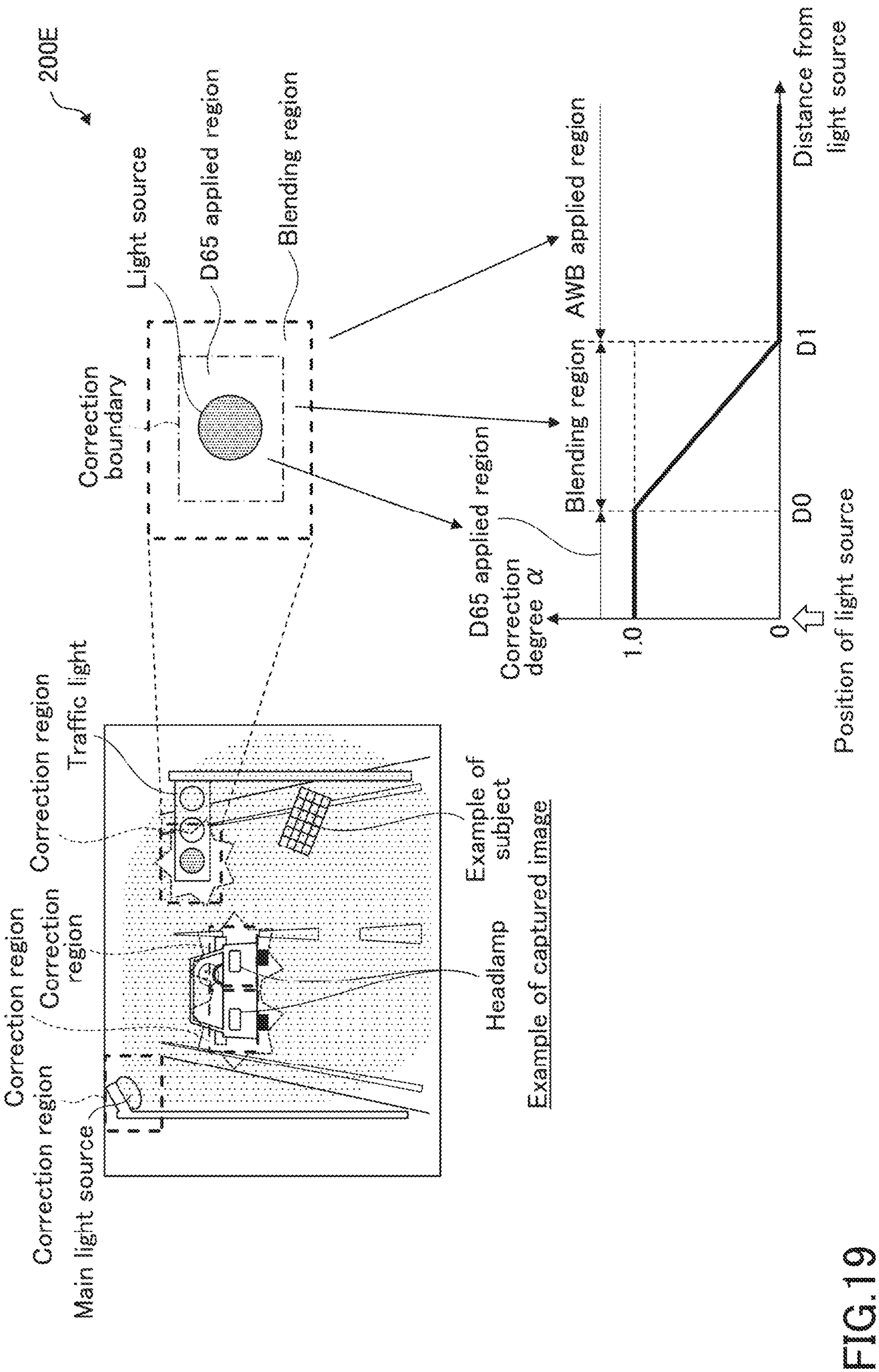
FIG. 19 is an explanatory diagram illustrating an example of a correction degree calculation process by the image processing apparatus according to a sixth embodiment.

FIG. 19 illustrates an example of a correction degree calculation process of the image processing apparatus according to a sixth embodiment. An image processing apparatus 200E (not illustrated) that performs the process illustrated in FIG. 19 has the same configuration as the image processing apparatus 200A of FIG. 8. For example, the image processing apparatus 200E includes the image data acquirer 210, the WB value calculator 220, the WB corrector 230, the point light source region detector 250, and the point light source region corrector 270A illustrated in FIG. 8. However, the functions of a correction degree calculator (not illustrated) included in the image processing apparatus 200E are different from the functions of the correction degree calculator 260 illustrated in FIG. 8.

Hereinafter, the correction degree calculator of the image processing apparatus 200E is referred to as a correction degree calculator 260E. The image processing apparatus 200E is similar to the image processing apparatus 200 illustrated in FIG. 1 through FIG. 3, and is provided in the image processing system 100 together with the information processing apparatus 300 and the display device 400.

The correction degree calculator 260E in this embodiment sets the correction degree α of the pixel having a distance from the light source, that is DO or less, to "1". The correction degree calculator 260E sets the correction degree α of the pixel having the distance from the light source, that is DO or greater and D1 or less, to become closer to "0" as the distance becomes larger. Further, the correction degree calculator 260E sets the correction degree α of the pixel having the distance from the light source, that is greater than D1, to "0".

The pixel region in which the distance from the light source is DO or greater and D1 or less is a blend region in which the D65WB process and the AWB process are blended according to the correction degree α. For example, the distance from the light source may be a distance from a center of the light source in a case where the light source in the image is small, or may be a distance from an outer peripheral portion of the light source closest to the pixel for which the distance is to be measured in a case where the light source in the image is large.

As illustrated in FIG. 19, the blend region may have a rectangular shape. For example, a first frame represented by a one-dot chain line indicates that the distance from the light source is D0, and a second frame represented by a broken line around the first frame indicates that the distance from the light source is D1. A region inside the first frame represented by the one-dot chain line is an example of a first region. A region between the first frame represented by the one-dot chain line and the second frame represented by the broken line is an example of a second region within a predetermined range outside the first region.

In the case where the blend region is formed to the rectangular shape, the correction degree α, strictly speaking, is set in correspondence with the pixel on the frame having a predetermined shape which successively spreads outward from the light source, and not in correspondence with the distance. The shape of the frame may be a circle, an ellipse, a polygon, or a curve, or may be a shape similar to an outer shape of the light source in the image. In this case, the correction degree α is set to "1" near the light source, set to gradually decrease as the distance from the light source increases, and is finally set to "0". As illustrated in FIG. 19, the correction degree α is set for each light source.

Further, the image processing apparatus 200E blends the image data after the first correction and the image data after the second correction for each pixel according to the correction degree α set by the correction degree calculator 260E to generate the corrected image data. For example, the correction degree α is a blending ratio of the pixel values of the image data after the first correction and the image data after the second correction.

The image data after the first correction is generated by the AWB process, and the image data after the second correction is generated by the D65WB process. For example, the blending process for each pixel of the image data after the first correction and the image data after the second correction is performed by a point light source region detector (not illustrated) corresponding to the point light source region detector 250A of FIG. 8, which is provided in the image processing apparatus 200E.

As described above, this embodiment can obtain the same effects as those obtainable by the embodiments described above. Further, in this embodiment, the degree of correction α is set according to the distance from the light source, and thus, the tint of the self-luminous subject whose color reproducibility deteriorates due to the automatic white balance adjustment can be corrected to the tint under the daylight light source.

The correction degree calculator 260E in this embodiment may be used in place of the correction degree calculator 260 illustrated in FIG. 8, FIG. 10, and FIG. 21 which will be described later, or may be used in the method of calculating the correction degree α in the correction degree calculator 260D illustrated in FIG. 15.

Seventh Embodiment

Figure 20:
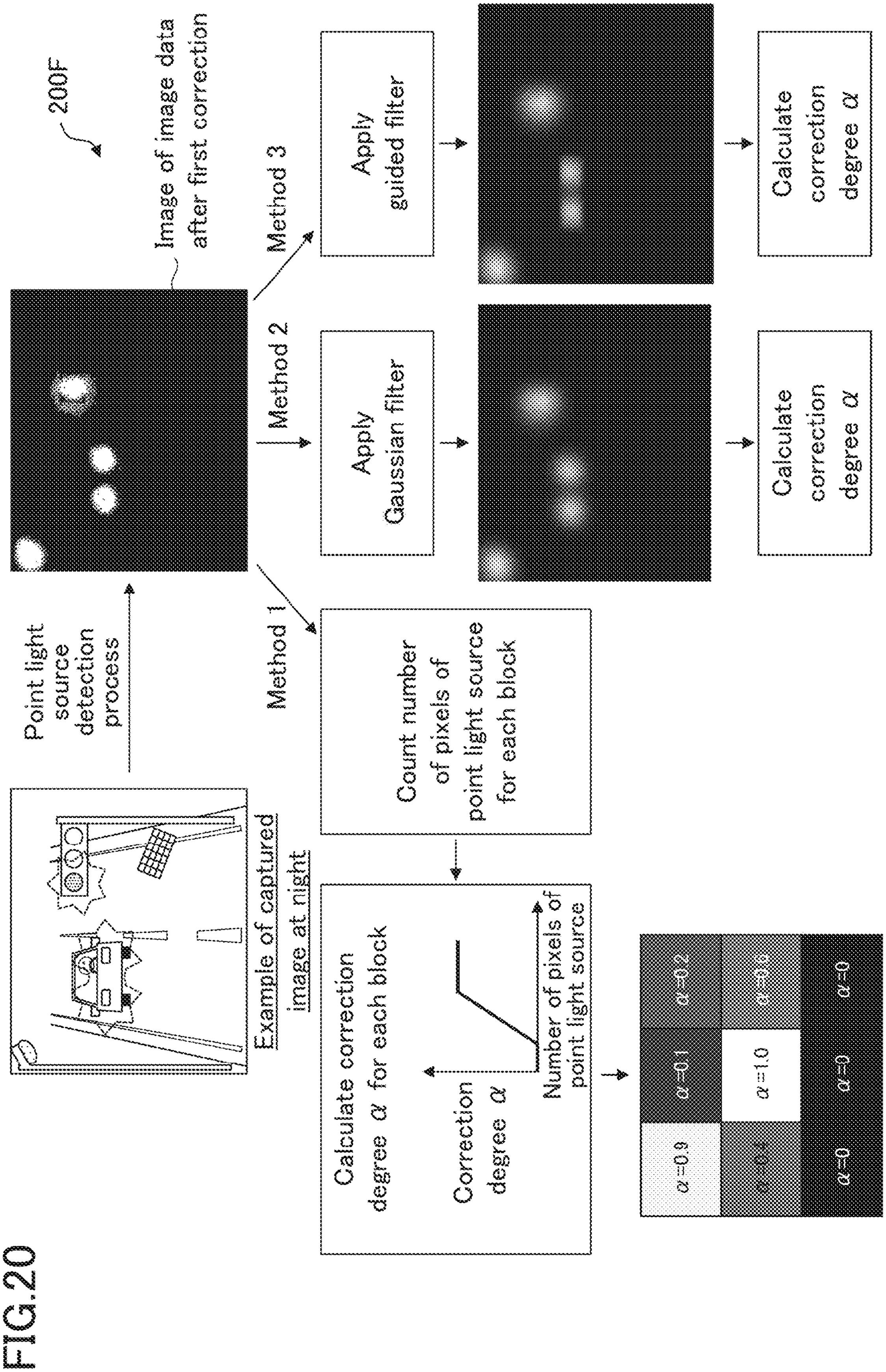
FIG. 20 is an explanatory diagram illustrating an example of the correction degree calculation process by the image processing apparatus according to a seventh embodiment.

FIG. 20 illustrates an example of correction degree calculation process by the image processing apparatus according to a seventh embodiment. An image processing apparatus 200F (not illustrated) that performs the process illustrated in FIG. 20 has the same configuration as the image processing apparatus 200 of FIG. 4. However, the functions of a point light source region detector and a correction degree calculator (not illustrated) of the image processing apparatus 200E are different from the functions of the point light source region detector 250 and the correction degree calculator 260 illustrated in FIG. 4. Hereinafter, the point light source region detector of the image processing apparatus 200F is referred to as a point light source region detector 250F, and the correction degree calculator of the image processing apparatus 200F is referred to as a correction degree calculator 260F. The image processing apparatus 200F is similar to the image processing apparatus 200 illustrated in FIG. 1 through FIG. 3, and is provided in the image processing system 100 together with the information processing apparatus 300 and the display device 400.

The point light source region detector 250F outputs information indicating the pixel in the point light source region having the luminance A higher than the threshold value VT0 to the correction degree calculator 260F, as point light source region information.

According to a method 1, the correction degree calculator 260F calculates the correction degree according to the number of pixels in the point light source region included in each block in a case where the image represented by the image data after the first correction is divided into a plurality of blocks. For example, as illustrated in the method 1 illustrated in FIG. 20, the correction degree calculator 260F sets the correction degree α to a value from "0" (0%) to "1.0" (100%) according to the number of pixels having the luminance A higher than or equal to the threshold value VT0, for each block.

The correction degree calculator 260F sets the correction degree α to a value closer to "1.0" as the number of pixels having the luminance A higher than or equal to the threshold value VT0 increases, and fixes the correction degree α to a value "1.0" in a case where the number of pixels having the luminance A higher than or equal to the threshold value VT0 is greater than or equal to a first predetermined number. The correction degree calculator 260F fixes the correction degree α to a value "0" in a case where the number of pixels having the luminance A lower than the threshold value VT0 is less than or equal to a second predetermined number which is smaller than the first predetermined number.

According to a method 2, the correction degree calculator 260F sets the pixel in the point light source region to a first pixel value (for example, "1.0") and the pixel not in the point light source region to a second pixel value (for example, "0"), for example. The correction degree calculator 260F assumes each pixel of the image represented by the image data after the first correction as having the first pixel value or the second pixel value and applies a Gaussian filter, to perform a smoothing process on the image. Further, the correction degree calculator 260F calculates the luminance A of each pixel of the smoothened image, and calculates the correction degree α according to the calculated luminance A.

According to a method 3, the correction degree calculator 260F assumes each pixel of the image represented by the image data after the first correction as having the first pixel value or the second pixel value, similar to the method 2. Further, the correction degree calculator 260F applies a guided filter, to perform an edge preserving smoothing process on the image, calculates the luminance A of each pixel of the smoothened image, and calculates the correction degree α according to the calculated luminance A.

As described above, this embodiment can obtain the same effects as those obtainable by the embodiments described above. Further, in this embodiment, even in a case where there is a region in which the pixel in the point light source region and the pixel in the non-point light source region coexist in the image data after the first correction, it is possible to make a change in the correction degree α gradual at a boundary between the point light source region and the non-point light source region by any one of the method 1, the method 2, and the method 3. In this case, it is possible to prevent an unnatural image, such as a mottled image of the corrected image data in which the color information of the pixel is corrected using the correction degree α.

In contrast, if the degree of correction α is calculated as it is in the case where pixels in the point light source region and the non-point light source region coexist in the image after performing the detection process to detect the point light source region illustrated in FIG. 20, there is a possibility that an undesirable effect, such as a dot mark visible in the image after the correction of the color information, will occur. In addition, the color of the periphery of the point light source region may be changed from the original color due to the illumination of the illumination light from the light source. For this reason, if the correction degree α is calculated as it is in the case where pixels of the point light source region and the non-point light source region coexist, there is a possibility that the image after the correction of the color information will become unnatural.

In the example used above to describe the method 1, the image represented by the image data after the first correction is divided into nine blocks, but the number of blocks is not limited to nine. As the number of blocks increases, the accuracy of the correction improves, but the calculation load increases. As the number of blocks decreases, the accuracy of the correction deteriorates, but the calculation load decreases. In addition, the filter applied to the method 2 and the method 3 is not limited to the Gaussian filter or the guided filter.

Eighth Embodiment

Figure 21:
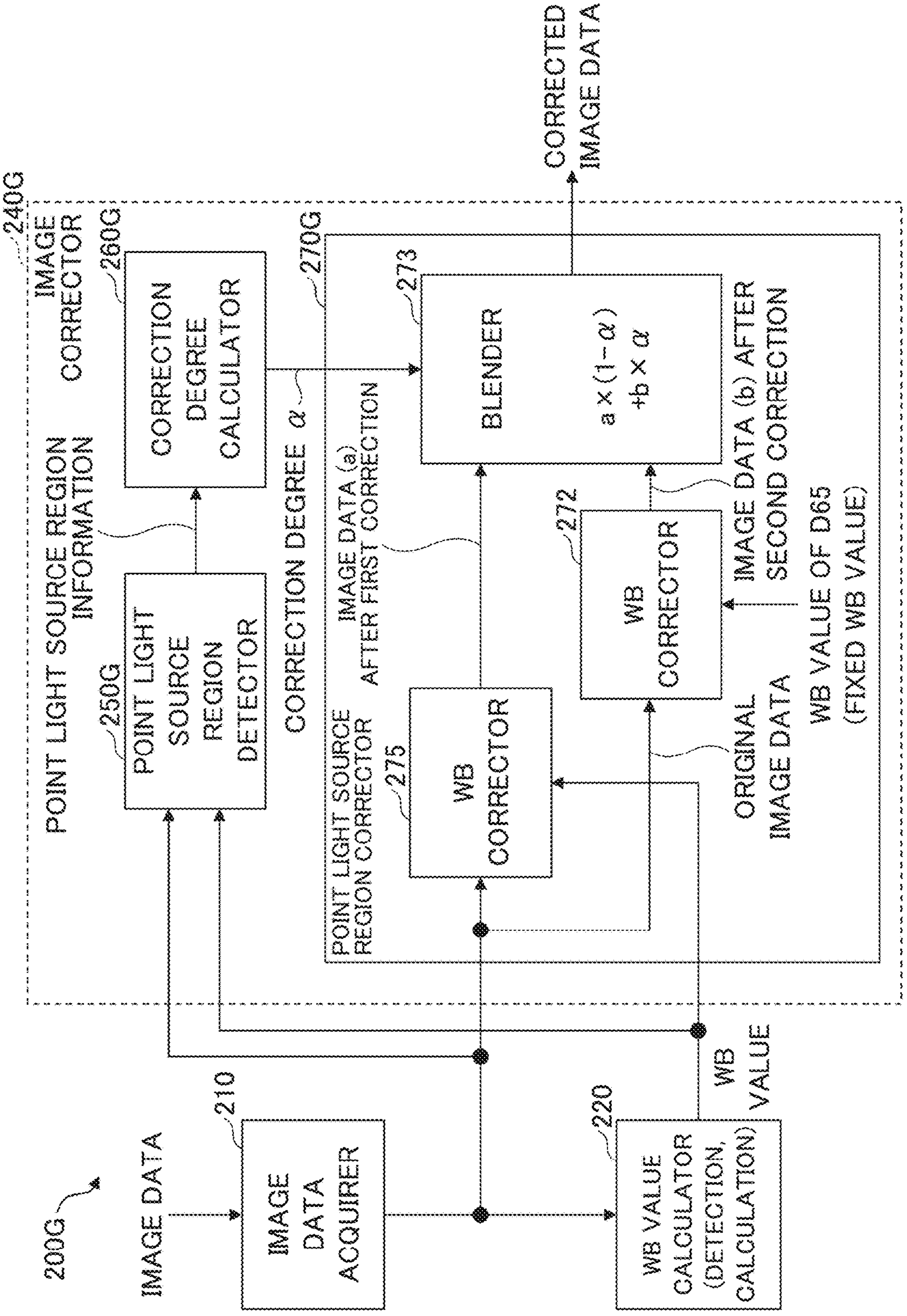
FIG. 21 is a functional block diagram illustrating an example of the functional configuration of the image processing apparatus according to an eighth embodiment.

FIG. 21 illustrates an example of the functional configuration of the image processing apparatus according to an eighth embodiment. In FIG. 21, those elements that are the same as the elements illustrated in FIG. 8 are designated by the same reference numerals, and a detailed description thereof will be omitted. An image processing apparatus 200G illustrated in FIG. 21 is similar to the image processing apparatus 200 illustrated in FIG. 1 through FIG. 3, and is provided in the image processing system 100 together with the information processing apparatus 300 and the display device 400.

Each functional unit (or functional part) of the image processing apparatus 200G illustrated in FIG. 21 may be implemented by software, such as an image processing program or the like executed by the image processing apparatus 200G, or may be implemented by hardware, or may be implemented by causing software and hardware to cooperate with each other.

The image processing apparatus 200G includes an image corrector 240A in place of the image corrector 240G illustrated in FIG. 8, and does not include the WB corrector 230 illustrated in FIG. 8. The image corrector 240G includes a point light source region detector 250G, a correction degree calculator 260G, and a point light source region corrector 270G in place of the point light source region detector 250, the correction degree calculator 260, and the point light source region corrector 270A illustrated in FIG. 8.

The point light source region corrector 270G includes a WB corrector 275 similar to the WB corrector 230 illustrated in FIG. 8, but does not include the inverse WB converter 271 illustrated in FIG. 8. The point light source region corrector 270G is an example of a color information corrector. Otherwise, the configuration of the image processing apparatus 200G is similar to that of the image processing apparatus 200A illustrated in FIG. 8. Because the point light source region corrector 270G does not include the inverse WB converter 271, it is possible to prevent the deterioration of the image quality that occurs when the image data after the first correction generated by the WB corrector 230 illustrated in FIG. 8 is converted into the original image by the inverse WB converter 271, for example.

The point light source region detector 250G performs a point light source region detection process according to the image data (input image) acquired by the image data acquirer 210 and the WB value calculated by the WB value calculator 220, and outputs the point light source region information to the correction degree calculator 260G.

In this embodiment, the point light source region detector 250G detects the point light source region using the image data before the automatic white balance adjustment is performed, and not the image data after the first correction already subjected to the automatic white balance adjustment. For this reason, the point light source region cannot be detected using the distance ΔC from the origin of the color difference space CbCr in the YCbCr color space described in FIG. 6. This is because the main light source is detected as a point light source region in the case where the image data before performing the automatic white balance adjustment is used. An example of the detection process performed by the point light source region detector 250G to detect the point light source region will be described with reference to FIG. 22. The point light source region detector 250G is an example of a region detector.

The correction degree calculator 260G sets the correction degree α of the point light source region to "1.0", and sets the correction degree α of the region other than the point light source region to "0". The correction degree calculator 260G may gradually change the correction degree α from "0" to "1.0" from the inside to the outside at the boundary (an outer peripheral portion of a cylindrical region in FIG. 22) of the point light source region.

The WB corrector 275 performs the white balance adjustment on each pixel of the image data according to the WB value calculated by the WB value calculator 220 and generates the image data after the first correction, similar to the WB corrector 230 illustrated in FIG. 8. The functions of the WB corrector 272 and the blender 273 are the same as the functions of the WB corrector 272 and the blender 273 illustrated in FIG. 8, respectively. Accordingly, the point light source region corrector 270G can generate the corrected image by blending the image data after the first correction and the image data after the second correction for each pixel according to the correction degree α, similar to the point light source region corrector 270A illustrated in FIG. 8.

Figure 22:
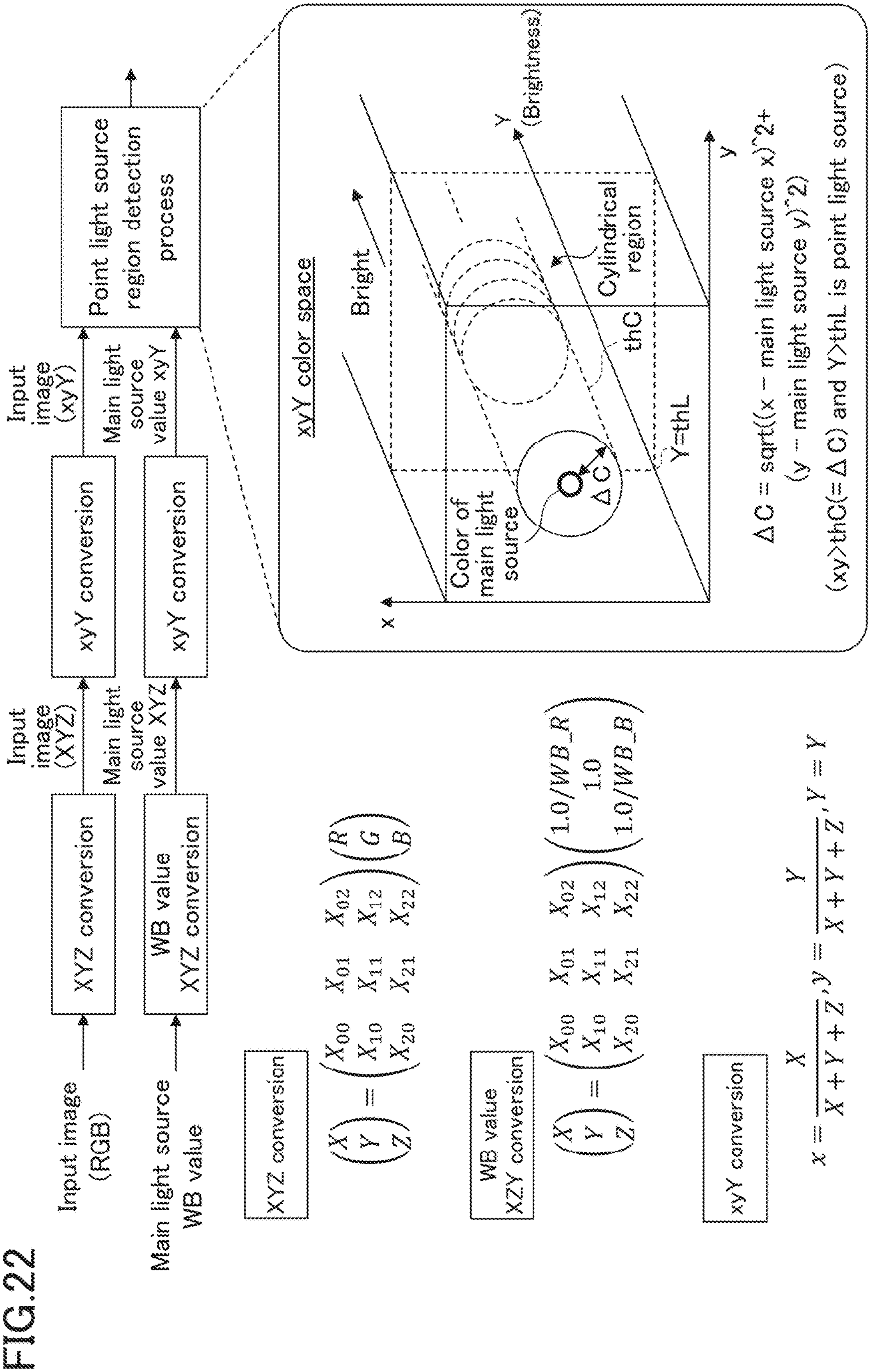
FIG. 22 is an explanatory diagram illustrating an example of the process by the point light source region detector in FIG. 21.

FIG. 22 illustrates an example of a process performed by the point light source region detector 250G illustrated in FIG. 21. The point light source region detector 250G performs an XYZ conversion on the input image represented in the RGB color space, and obtains coordinates of the input image represented in an XYZ color space. Further, the point light source region detector 250G performs an xyY conversion on the coordinates of the input image represented in the XYZ color space to obtain coordinates of the input image represented by an xyY color space.

The point light source region detector 250G also performs the XYZ conversion on the WB value of the main light source, such as the street lamp or the like, calculated by the WB value calculator 220, and obtains coordinates of the WB value of the main light source indicated in the XYZ color space. Further, the point light source region detector 250G performs the xyY conversion on the coordinates of the WB value of the main light source indicated in the XYZ color space, and obtains reference coordinates which are the coordinates of the WB value of the main light source indicated in the xyY color space.

Coefficients used for the XYZ conversion illustrated in FIG. 22 are calculated in advance according to the characteristics of the imaging device 507. An x value, a y value, and a Y value obtained by the xyY conversion are calculated by a formula illustrated in FIG. 22. In this example, the color of the pixel is represented by the x value and the y value, and a brightness of the pixel is represented by a brightness Y corresponding to luminance.

The point light source region detector 250G performs a detection process to detect the point light source region included in the image data after the first correction, using the coordinates of the input image converted into the xyY color space and the reference coordinates of the WB value of the main light source. First, the point light source region detector 250G sets, in the xyY color space, the color that is within a range of a first distance ΔC with respect to a color (x, y) at the reference coordinates of the WB value of the main light source, such as the street lamp or the like, as the color of the subject illuminated by the illumination light from the main light source. The color (x, y) is represented by chromaticity coordinates (x, y) in the xyY color space.

Next, the point light source region detector 250G detects a first region which is a pixel region having the brightness Y that is a first threshold value thL or more higher with respect to the brightness Y at the reference coordinates of the WB value of the main light source, and has a pixel value (x, y, Y) outside the range of the first distance ΔC, as the point light source region. In the example illustrated in FIG. 22, the point light source region detector 250G detects, as the point light source region, the region (first region) outside in the lateral cross sectional direction with respect to the cylindrical region in which the color (x, y) is indicated by the range of the first distance ΔC.

Further, the point light source region detector 250G outputs the point light source region information indicating the determined point light source region to the correction degree calculator 260G illustrated in FIG. 21. As described above, the correction degree calculator 260G sets the correction degree α to "1.0" or "0" according to whether or not the region is the point light source region, for example.

Thereafter, the point light source region corrector 270G illustrated in FIG. 21 blends the image data after the first correction and the image data after the second correction for each pixel, according to the correction degree α, to generate the corrected image, similar to the point light source region corrector 270A illustrated in FIG. 8.

As described above, this embodiment can obtain the same effects as those obtainable by the embodiments described above. Further, in this embodiment, because the point light source region corrector 270G does not include the inverse WB converter 271, the processing load of the point light source region corrector 270G can be reduced compared to the case where the inverse WB converter 271 is included. In addition, because the point light source region corrector 270G does not include the inverse WB converter 271, it is possible to prevent the deterioration of the image quality that occurs when the image data after the first correction generated by the WB corrector 230 illustrated in FIG. 8 is converted into the original image by the inverse WB converter 271, for example.

According to the disclosed technique, it is possible to reduce deterioration of a color reproducibility of a self-luminous subject caused by an automatic white balance adjustment even in a case where the self-luminous subject is included in a subject region illuminated by a main light source.

Although the embodiments are numbered with, for example, "first," "second," "third," "fourth," "fifth," "sixth," "seventh," or "eighth," the ordinal numbers do not imply priorities of the embodiments. Many other variations and modifications will be apparent to those skilled in the art.

Various aspects of the subject-matter described herein may be set out non-exhaustively in the following numbered clauses:

Clause 1. An image processing apparatus comprising:

a memory device configured to store a program; and a processor configured to execute the program and perform a process including:

acquiring first image data;

calculating a white balance value used for an automatic white balance adjustment according to the first image data;

performing an automatic white balance adjustment on the first image data according to the white balance value to generate image data after a first correction;

calculating a first luminance in the image data after the first correction, obtained by adding a color difference component to a luminance, and detecting a first region including a pixel having the first luminance higher than a first threshold value;

setting a correction degree of a pixel included in the first region, a pixel included in a second region within a predetermined range outside the first region, and a pixel in a region outside the second region, so that the correction degree is large in the first region and decreases toward the region outside the second region; and correcting the color information of the pixel included in at least the first region in the image data after the first correction, according to the correction degree.

Clause 2. The image processing apparatus according to clause 1, wherein the setting sets the correction degree of the pixel included in the first region to 100%, sets the correction degree of the pixel included in the second region from 100% to 0% as a distance from the first region increases, and sets the correction degree of the pixel included in the region outside the second region to 0%.

Clause 3. The image processing apparatus according to clause 1, wherein:

the correcting the color information includes performing a white balance adjustment on the first image data using a white balance value of a standard light source to generate image data after a second correction, and sets a pixel value of the pixel included in the first region to a pixel value of the image data after the second correction, sets the pixel value of the pixel included in the second region by blending the pixel values of the image data after the first correction and the image data after the second correction based on the correction degree, and sets a pixel value of a pixel included outside the second region to a pixel value of the image data after the first correction, and the correction degree is a blending ratio of the pixel values of the image data after the first correction and the image data after the second correction.

Clause 4. An image processing method comprising:

acquiring first image data;

calculating a white balance value used for an automatic white balance adjustment according to the first image data;

performing an automatic white balance adjustment on the first image data according to the white balance value to generate image data after a first correction;

calculating a first luminance in the image data after the first correction, obtained by adding a color difference component to a luminance, and detecting a first region including a pixel having the first luminance higher than a first threshold value;

calculating a correction degree of color information of a pixel included in at least the first region in the image data after the first correction, according to the first luminance; and correcting the color information of the pixel included in at least the first region in the image data after the first correction, according to the correction degree.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:

a memory device configured to store a program; and a processor configured to execute the program and perform a process including:

acquiring first image data;

calculating a white balance value used for an automatic white balance adjustment according to the first image data;

performing an automatic white balance adjustment on the first image data according to the white balance value to generate image data after a first correction;

calculating a first luminance in the image data after the first correction, obtained by adding a color difference component to a luminance, and detecting a first region including a pixel having the first luminance higher than a first threshold value;

calculating a correction degree of color information of a pixel included in at least the first region in the image data after the first correction, according to the first luminance; and correcting the color information of the pixel included in at least the first region in the image data after the first correction, according to the correction degree.

2. The image processing apparatus as claimed in claim 1, wherein the calculating the first luminance includes:

calculating the first luminance by adding a luminance in a color space including luminance information, and a color difference component in the color space, for at least each pixel included in the image data after the first correction.

3. The image processing apparatus as claimed in claim 1, wherein the calculating the correction degree sets the correction degree of a pixel having the first luminance higher than or equal to a first threshold value and lower than or equal to a second threshold value larger than the first threshold value to a value from 0% to 100% as the first luminance increases, and sets the correction degree of a pixel having the first luminance higher than the second threshold value to 100%.

4. The image processing apparatus as claimed in claim 1, wherein the calculating the first luminance outputs information indicating the pixel in the first region to the correction degree calculator, and the calculating the correction degree calculates the correction degree according to the number of pixels in the first region included in each block in a case where the image represented by the image data after the first correction is divided into a plurality of blocks.

5. The image processing apparatus as claimed in claim 1, wherein:

the calculating the first luminance outputs information indicating the pixel in the first region to the calculating the correction degree, and the calculating the correction degree calculates the correction degree by performing a smoothing process on an image represented by the image data after the first correction by regarding the pixel in the first region as having a first pixel value and a pixel not in the first region as having a second pixel value.

6. The image processing apparatus as claimed in claim 1, wherein the color information corrector includes:

a second white balance corrector configured to perform a white balance adjustment on the first image data using a white balance value of a standard light source to generate image data after a second correction, and a blender configured to blend pixel values of the image data after the first correction and the image data after the second correction, based on the correction degree.

7. The image processing apparatus as claimed in claim 3, wherein the correcting the color information corrects the color of the pixel to approach an achromatic color as the correction degree of the pixel becomes larger.

8. An image processing apparatus comprising:

a memory device configured to store a program; and a processor configured to execute the program and perform a process including:

acquiring first image data;

calculating a white balance value used for an automatic white balance adjustment according to the first image data;

performing an automatic white balance adjustment on the first image data according to the white balance value to generate image data after a first correction;

calculating a first luminance in the image data after the first correction, obtained by adding a color difference component to a luminance, and detecting a first region including a pixel having the first luminance higher than a first threshold value, for each of a plurality of types of light sources;

calculating a first correction degree of a specific pixel including specific color information, and calculating a second correction degree of a normal pixel other than the specific pixel, included in the first region;

correcting color information of the specific pixel included in at least the first region according to the first correction degree; and correcting color information of the normal pixel included in at least the first region according to the second correction degree.

9. The image processing apparatus as claimed in claim 8, wherein the calculating the first correction degree sets, in the first region, a pixel having a distance r of polar coordinates (r, θ) of a color difference space CbCr greater than a first threshold value as the specific pixel, and a pixel having the distance r less than or equal to the first threshold value as the normal pixel.

10. The image processing apparatus as claimed in claim 8, wherein the correcting the color information of the specific pixel includes:

performing a white balance adjustment on the first image data using a white balance value of a standard light source, to generate image data after a second correction, and blending pixel values of the image data after the first correction and the image data after the second correction, based on the first correction degree, and the correcting the color information of the normal pixel corrects the color of the pixel to approach an achromatic color as the second correction degree of the pixel becomes larger.

11. The image processing apparatus as claimed in claim 8, wherein the calculating the first correction degree sets a pixel including color information of a red lamp of a traffic light as the specific pixel.

12. An image processing apparatus comprising:

a memory device configured to store a program; and a processor configured to execute the program and perform a process including:

acquiring first image data;

calculating a white balance value used for an automatic white balance adjustment according to the first image data;

performing an automatic white balance adjustment on the first image data according to the white balance value to generate image data after a first correction;

calculating reference coordinates that are coordinates of the white balance value in an xyY color space, and detecting a first region including a pixel having a luminance Y that is a first threshold value or more higher than a luminance Y of the reference coordinates and having color difference coordinates (x, y) that is separated by a first distance or more from color difference coordinates (x, y) of the reference coordinates, in the first image data represented in the xyY color space;

setting a correction degree of color information of a pixel included in the first region greater than a correction degree of color information of a pixel not included in the first region, in the first image data; and correcting the color information of the pixel included in at least the first region in the image data after the first correction according to the correction degree.

13. The image processing apparatus as claimed in claim 12, wherein the correcting includes:

performing a white balance adjustment on the first image data using a white balance value of a standard light source, to generate image data after a second correction, and blending pixel values of the image data after the first correction and the image data after the second correction, based on the correction degree.

* * * * *